United States Patent
Correale, Jr. et al.

(10) Patent No.: US 10,366,196 B2
(45) Date of Patent: *Jul. 30, 2019

(54) STANDARD CELL ARCHITECTURE FOR DIFFUSION BASED ON FIN COUNT

(71) Applicant: QUALCOMM Incorporated, San Diego, CA (US)

(72) Inventors: Anthony Correale, Jr., Raleigh, NC (US); Benjamin Bowers, Cary, NC (US); Tracey Della Rova, Wake Forest, NC (US); William Goodall, III, Cary, NC (US)

(73) Assignee: QUALCOMM Incorporated, San Diego, CA (US)

(*) Notice: Subject to any disclaimer, the term of this patent is extended or adjusted under 35 U.S.C. 154(b) by 210 days.

This patent is subject to a terminal disclaimer.

(21) Appl. No.: 15/629,728

(22) Filed: Jun. 21, 2017

(65) Prior Publication Data

US 2017/0371995 A1    Dec. 28, 2017

Related U.S. Application Data

(60) Provisional application No. 62/353,536, filed on Jun. 22, 2016.

(51) Int. Cl.
*G06F 17/50* (2006.01)
*H01L 27/00* (2006.01)
(Continued)

(52) U.S. Cl.
CPC ...... *G06F 17/5072* (2013.01); *G06F 17/5068* (2013.01); *G06F 17/5077* (2013.01);
(Continued)

(58) Field of Classification Search
None
See application file for complete search history.

(56) References Cited

U.S. PATENT DOCUMENTS

| 7,838,948 | B2  | 11/2010 | Gossner |
| 8,258,577 | B2* | 9/2012  | Dixit ................ H01L 21/82382 |
|           |     |         | 257/206 |

(Continued)

OTHER PUBLICATIONS

Harris D., "High Speed Cmos VLSI Design; Lecture 2: Logical Effort & Sizing", Nov. 4, 1997, XP055400983, Retrieved from the Internet: URL:http://pages.hmc.edu/harris/class/hal/lect2.pdf [retrieved on Aug. 24, 2017], 12 pages.

(Continued)

*Primary Examiner* — Leigh M Garbowski
(74) *Attorney, Agent, or Firm* — Muncy, Geissler, Olds & Lowe, P.C.

(57) ABSTRACT

Disclosed systems and methods pertain to finfet based integrated circuits designed with logic cell architectures which support multiple diffusion regions for n-type and p-type diffusions. Different diffusion regions of each logic cell can have different widths or fin counts. Abutting two logic cells is enabled based on like fin counts for corresponding p-diffusion regions and n-diffusion regions of the two logic cells. Diffusion fills are used at common edges between the two logic cells for extending lengths of diffusion, based on the like fin counts. The logic cell architectures support via redundancy and the ability to selectively control threshold voltages of different logic cells with implant tailoring. Half-row height cells can be interleaved with standard full-row height cells.

36 Claims, 14 Drawing Sheets

(51) Int. Cl.
  *H01L 23/535* (2006.01)
  *H01L 27/02* (2006.01)
  *H01L 27/088* (2006.01)
  *H01L 27/118* (2006.01)
  *H01L 27/092* (2006.01)

(52) U.S. Cl.
  CPC ........ *H01L 23/535* (2013.01); *H01L 27/0207* (2013.01); *H01L 27/0886* (2013.01); *H01L 27/0924* (2013.01); *H01L 27/11807* (2013.01); *G06F 2217/12* (2013.01)

(56) References Cited

U.S. PATENT DOCUMENTS

| | | | |
|---|---|---|---|
| 8,680,626 B2 | 3/2014 | Smayling et al. | |
| 8,901,615 B2 | 12/2014 | Moroz et al. | |
| 8,943,455 B2 | 1/2015 | Chen et al. | |
| 9,009,641 B2 * | 4/2015 | Becker | H01L 27/092 716/118 |
| 9,257,429 B2 | 2/2016 | Moroz et al. | |
| 9,317,646 B2 | 4/2016 | Lu et al. | |
| 9,337,099 B1 | 5/2016 | Jain et al. | |
| 9,563,733 B2 * | 2/2017 | Becker | G06F 17/5072 |
| 9,941,263 B2 * | 4/2018 | Shimbo | H01L 27/0207 |
| 9,948,304 B2 * | 4/2018 | Aurola | H01L 27/0207 |
| 2006/0186478 A1 | 8/2006 | Hughes et al. | |
| 2006/0190893 A1 | 8/2006 | Morton | |
| 2010/0058260 A1 | 3/2010 | Correale, Jr. et al. | |
| 2013/0126978 A1 | 5/2013 | Becker et al. | |
| 2015/0137256 A1 | 5/2015 | Kawa et al. | |
| 2016/0172351 A1 | 6/2016 | Shimbo | |
| 2017/0373090 A1 | 12/2017 | Correale, Jr. et al. | |

OTHER PUBLICATIONS

International Search Report and Written Opinion—PCT/US2017/038730—ISA/EPO—dated Nov. 7, 2017.
Kim M.S., et al., "Comparative Area and Parasitics Analysis in FinFET and Heterojunction Vertical TFET Standard Cells", ACM Journal on Emerging Technologies in Computing Systems, May 25, 2016, vol. 12. No. 4, XP055400998, ISSN: 1550-4832, DOI: 10.1145/2914790, pp. 1-23.
Partial International Search Report—PCT/US2017/038730—ISA/EPO—Sep. 8, 2017.

* cited by examiner

Standard cell architecture Illustrating distributed power and ground rails

Standard cell architecture Illustrating Nand-2 implementation

STANDARD CELL ARCHITECTURE FOR DIFFUSION BASED ON FIN COUNT

CROSS-REFERENCE TO RELATED APPLICATIONS

The present Application for Patent claims the benefit of Provisional Patent Application No. 62/353,536 entitled "STANDARD CELL ARCHITECTURE FOR DIFFUSION BASED ON FIN COUNT" filed Jun. 22, 2016, and assigned to the assignee hereof and hereby expressly incorporated herein by reference in its entirety.

FIELD OF DISCLOSURE

Disclosed aspects relate to apparatuses including standard logic cells, standard logic cell designs and libraries thereof, with some exemplary aspects thereof including support for multiple diffusion regions, distributed power lines, and diffusion sharing amongst logic cells having different fin counts.

BACKGROUND

In transistor level layout (e.g., of a metal oxide semiconductor (MOS) transistor), a length of diffusion (LOD) refers to an amount by which a diffusion region between source and drain terminals of the transistor extends away from a gate terminal. An LOD effect refers to stress induced on the MOS transistor based on the LOD. In general, a smaller LOD causes greater stress or in other words, has a worse LOD effect, while increasing or improving the LOD can lead to performance improvements.

It is difficult to completely mitigate LOD effect on transistors in a transistor level layout using standard logic cells and placement techniques. Some techniques to mitigate the LOD effect focus on extending the diffusion region, where possible, with left and right diffusion edges configured to share common electrical junctions (e.g., power and ground connections). However, extending the diffusion region in this manner may hinder cell placement methodologies which attempt to place logic cells of equal or comparable physical footprints (also measured in terms of cell pitch or width of the diffusion layers) in a manner which results in logic cells being abutted or adjoined. Such abutment can enable sharing of diffusion edges between adjoining cells and potentially increase the effective LOD of adjoining cells. However, logic cell placement to improve diffusion edge sharing in this manner may not be feasible in some conventional designs using standard logic cell libraries.

For example, considering Fin Field Effect Transistor (or "finfet") technologies wherein a common gate terminal (e.g., made of polysilicon or "poly" material or some other material including metal) may be shared among two or more fins. Source and drain terminals of the finfets are formed by connecting common diffusion regions formed underneath the fins to power supply rails (e.g., Vdd and ground) or other common nodes. The common poly may also be shared amongst multiple finfets. Finfet logic libraries may include logic cells with different fin counts. If the diffusion regions of some fins can be extended as noted above, the logic libraries may include logic cells with non-uniform lengths of diffusion regions, which means that some fins of adjoining cells may not be able to share their diffusion regions with neighboring cells. Further, a lateral width of diffusion (in a transverse direction to the length of diffusion) varies proportionally with the number of fins of each logic cell in a logic cell layout. While conventional layout techniques may allow for abutment of logic cells with the same number of fins or the same width, such techniques may not permit placement of two cells with different fin counts in a manner which could have allowed for sharing diffusion regions.

However, with fixed fin counts, integrating circuits requiring different fin counts becomes difficult to realize. This is because conventional techniques do not support fin stepping (i.e., abutting cells with different fin counts to share a common diffusion), which may be desirable in ratio based logic. Ratio based logic is conventionally encountered in designs comprising p-channel FETs (or simply, "pfets") and n-channel FETs (or "nfets"). For example, a 2-input NAND gate design may include two 4-fin nfets coupled in series between output and ground terminals (effectively forming 4 fins) and two 2-fin pfets coupled in parallel with one another and connected between supply voltage Vdd and the output (effectively forming 2 fins). The size of the nfets (i.e., in terms of their fin counts) is designed to be twice the size of their counterpart pfets as discussed above in order to achieve balanced output transitions and delays for both rising and falling inputs to the 2-input NAND gate. A similar ratio in terms of fin counts of component logic cells may also be used for other standard cells such as a 2-input NOR gate designed with finfet technology.

Since fin stepping is not supported in conventional designs, separate diffusion domains may be provided for logic cells with different fin counts, e.g., in the design of logic gates such as the 2-input NAND gate discussed above. However, restricting the design to having separate diffusion domains may foreclose the possibility of sharing a common diffusion edge between two cells with different fin counts. In an effort to integrate logic cells with different fin counts, conventional designs may include breaks in the diffusion regions for the nfets and pfets, and sometimes even within a cell, e.g. in the case of a 2-input AND gate). As understood from the foregoing discussion, breaks in the diffusion region can result in short LODs or adversely impact the LOD effects.

Accordingly, a need in the art is recognized for logic cell designs which can support ratio based logic while also avoiding the LOD effects which may arise due to diffusion breaks.

SUMMARY

Exemplary aspects of the invention are directed to designs of standard cell architectures of integrated circuits using finfet based logic cells. The logic cells can support multiple diffusion regions of n-type and/or p-type, with finfets formed in each diffusion region which can have the same or different fin counts. Easy abutment of logic cells is enabled by placing logic cells having diffusion regions of like fin counts placed adjacent to one another. LOD effects can be mitigated using diffusion fills between diffusion regions of like fin counts and common potential. Distributed power rail networks may be provided with dedicated power rails for one or more diffusion regions of the logic cells. Some aspects include support for via redundancy and the ability to selectively control threshold voltages of different cells with same or different levels of implants. In some aspects, half-row height cells can be created and placed in sub-rows in conjunction with full-row height cell placements.

For example, an exemplary aspect is directed to a method of designing an integrated circuit with finfet based logic cells, the method comprising forming at least a first logic cell with at least one of two or more p-diffusion regions, or two or more n-diffusion regions.

Another exemplary aspect is directed to a method of designing an integrated circuit with finfet based logic cells. The method comprises placing a first logic cell having a first logic cell boundary adjacent to a second logic cell having a second logic cell boundary, wherein the first logic cell boundary and the second logic cell boundary have a common edge. The first logic cell comprises at least one pfet formed on a first p-diffusion region with a first fin count and at least one nfet formed on a first n-diffusion region with a second fin count, and the second logic cell comprises at least one pfet formed on a second p-diffusion region with the first fin count and at least one nfet formed on the second n-diffusion region with the second fin count. The method further comprises forming at least one of a first p-diffusion fill traversing the common edge and joining the first p-diffusion region of the first logic cell and the second p-diffusion region of the second logic cell, or a first n-diffusion fill traversing the common edge and joining the first n-diffusion region of the first logic cell and the second n-diffusion region of the second logic cell.

Another exemplary aspect is directed to a method of designing an integrated circuit with finfet based logic cells. The method comprises forming a first full row comprising at least a first full-row height logic cell, wherein the first full-row height logic cell comprises at least one of two or more p-diffusion regions or two or more n-diffusion regions, forming a second full row adjacent to the first full row, the second full row comprising at least a second full-row height logic cell, wherein the second full-row height logic cell comprises at least one of two or more p-diffusion regions or two or more n-diffusion regions, and interspersing one or more sub-rows between the first full row and the second full row, wherein at least a first sub-row of the one or more sub-rows comprises a first half-row height logic cell comprising at least one p-diffusion region and at least one n-diffusion region. At least one of: the at least one p-diffusion region of the first half-row height logic cell is adjacent to one of the two or more p-diffusion regions of the first full-row height logic cell or the second full-row height logic cell, or the at least one n-diffusion region of the first half-row height logic cell is adjacent to one of the two or more n-diffusion regions of the first full-row height logic cell or the second full-row height logic cell.

Yet another exemplary aspect is directed to a non-transitory computer-readable storage medium comprising code, which, when executed by a processor, causes the processor to perform operations for designing an integrated circuit with finfet based logic cells, the non-transitory computer-readable storage medium comprising: code for forming at least a first logic cell with at least one of: two or more p-diffusion regions; or two or more n-diffusion regions.

Yet another exemplary aspect is directed to a non-transitory computer-readable storage medium comprising code, which, when executed by a processor, causes the processor to perform operations for designing an integrated circuit with finfet based logic cells, the non-transitory computer-readable storage medium comprising: code for placing a first logic cell having a first logic cell boundary adjacent to a second logic cell having a second logic cell boundary, wherein the first logic cell boundary and the second logic cell boundary have a common edge, wherein the first logic cell comprises at least one pfet formed on a first p-diffusion region with a first fin count and at least one nfet formed on a first n-diffusion region with a second fin count, and wherein the second logic cell comprises at least one pfet formed on a second p-diffusion region with the first fin count and at least one nfet formed on the second n-diffusion region with the second fin count; and code for forming at least one of: a first p-diffusion fill traversing the common edge and joining the first p-diffusion region of the first logic cell and the second p-diffusion region of the second logic cell; or a first n-diffusion fill traversing the common edge and joining the first n-diffusion region of the first logic cell and the second n-diffusion region of the second logic cell.

Another exemplary aspect is directed to a non-transitory computer-readable storage medium comprising code, which, when executed by a processor, causes the processor to perform operations for designing an integrated circuit with finfet based logic cells, the non-transitory computer-readable storage medium comprising: code for forming a first full row comprising at least a first full-row height logic cell, wherein the first full-row height logic cell comprises at least one of two or more p-diffusion regions or two or more n-diffusion regions; code for forming a second full row adjacent to the first full row, the second full row comprising at least a second full-row height logic cell, wherein the second full-row height logic cell comprises at least one of two or more p-diffusion regions or two or more n-diffusion regions; and code for interspersing one or more sub-rows between the first full row and the second full row, wherein at least a first sub-row of the one or more sub-rows comprises a first half-row height logic cell comprising at least one p-diffusion region and at least one n-diffusion region, wherein at least one of: the at least one p-diffusion region of the first half-row height logic cell is adjacent to one of the two or more p-diffusion regions of the first full-row height logic cell or the second full-row height logic cell, or the at least one n-diffusion region of the first half-row height logic cell is adjacent to one of the two or more n-diffusion regions of the first full-row height logic cell or the second full-row height logic cell.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
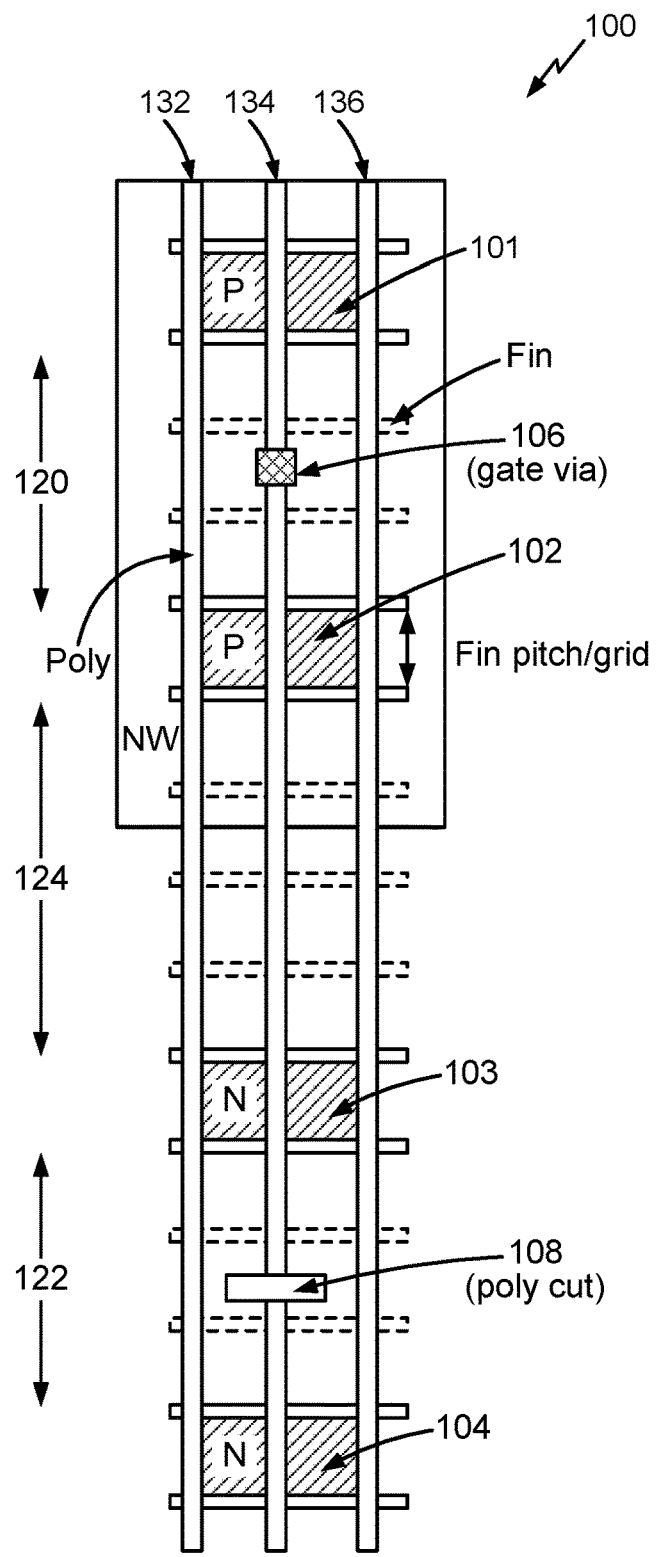
FIG. 1 illustrates a basic standard cell architecture 100 with defined diffusion regions.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to an apparatus comprising exemplary logic cells, logic cell designs and related standard cell libraries which can support ratio based logic while also avoiding the LOD effects which may arise in the previously mentioned conventional approaches. Some aspects are also directed to sharing a common polysilicon (poly) gate across two different diffusion domains within the same logic cell, which also enables support for the same or different levels of implants for separate diffusion regions (e.g., pertaining to different cells). Furthermore, exemplary aspects also support different threshold voltages for different cells in a design (e.g., integrated on diffusion regions), different channel lengths (e.g., based on support for different poly widths), etc. In turn, controlling threshold voltage leads to reducing leakage power and improving power and performance characteristics of the logic cells.

By way of background, conventional standard cell layout designs include n-type and p-type diffusion regions (or n-regions and p-regions, respectively) disposed between a set of power rails, e.g., Vdd and ground. An n-region is formed with a single nfet diffusion domain (or n-domain) using n-type doping in a p-type well for populating the nfet fins; and a p-region is formed with a single pfet diffusion domain (or p-domain) using p-type doping in an n-type well for populating the pfet fins.

In exemplary aspects, on the other hand, more than one n-domain, e.g., a pair of n-domains, may be provided in the n-region, wherein the n-domains may be stacked one above the other in a y-direction such that each n-region may support multiple fins, separated by a predefined fin distance (e.g., maintaining at least a minimum fin distance specified in a corresponding logic cell library for the n-region). Similarly the p-regions may include more than one, e.g., a pair of p-domains stacked one above the other in the y-direction, with each p-region capable of supporting multiple fins and separated by a predefined fin distance (e.g., maintaining at least a minimum fin distance specified in a corresponding logic cell library for the n-region). The fin distances allow integration of a gate contact, e.g., a gate via, on a poly shared between two like diffusions, to form a connection with a metal layer (e.g., a metal to diffusion "MD" connection as known in the art). The separations provided by the fin distances also allow a poly cut to be placed on a poly layer, to isolate gate terminals of two like diffusions connected to a poly layer which was shared before the poly cut was placed (e.g., a poly cut may be placed between n-domains or p-domains comprising nfets or pfets, respectively). It is noted that this approach differs from mirror flipping two standard cells to create a double row, because in the exemplary aspects, the like diffusion regions are shared or shareable between standard logic cells, as opposed to diffusion regions shared between two different cells or placement rows.

In a distributed power rail network, which is supported by aspects of this disclosure, multiple power rails may be provided, with support for each diffusion region in a logic cell to be connected to a different or dedicated power rail, which can lead to lower losses and improved efficiencies. The space between the n-domains and p-domains in exemplary standard cells may be on a predefined fin grid or pitch (to maintain the fin distances) and supports the ability to integrate poly gate contacts on two horizontally adjacent poly lines for connecting to two vertically adjacent laterally running wiring tracks between the distributed power rails, for example. Concurrently, the ability to integrate the above-mentioned poly cut may also be retained in the fin grid. The space defined on the grid between the n and p-regions can support various lateral wiring tracks, e.g., for signal and power lines, provided that the predefined fin pitch is satisfied.

In exemplary aspects, the size of diffusion regions within a given domain may be defined to be of uniform width in order to support a uniform number of fins for the same diffusion width. This allows logic cells to abut and to share a common diffusion edge, which allows LOD optimization. The uniform sizing of the diffusion regions also allows diffusion regions within logic cell layouts formed using two or more standard cells. For example, a 2-input AND formed using a 2-input NAND gate and an inverter may have diffusion regions shared between the standard cells of the component 2-input NAND gate and the output inverter, even though the sizes of these component devices may not be the same.

FIG. 1 illustrates an exemplary standard cell architecture 100 which may be incorporated or integrated in any suitable apparatus or integrated circuit design. Architecture 100 shows four separate diffusion regions (or "RX islands"). A first island and a second island are defined as p-diffusion regions 101 and 102 respectively. A third island and a fourth island are defined as n-diffusion regions 103 and 104, respectively. Polysilicon layers or poly lines 132, 134, and 136 are shown in a vertical direction, separated by specified horizontal distances between adjacent ones of these poly lines 132, 134, 136 defined in corresponding standard cell libraries according to which cell 100 is designed in exemplary aspects. In this depiction, the extreme poly lines 132 and 136 may be dummy or floating poly lines which are not connected to signal or power lines, while the middle poly 134 may be connected to a gate terminal for the logic cells of cell architecture 100.

A space shown as gap 120 between p-diffusion regions 101 and 102 is consistent with a fin grid or pitch and minimum requirements for diffusion vertical space specified in corresponding standard cell libraries. This gap 120 is configured to support a poly gate contact shown as gate via 106 to connect poly 134 to a higher metal layer (not shown) or alternatively, a poly cut (not shown in this view). Similarly gap 122 between n-diffusion regions 103 and 104 is also is consistent with a respective specified fin grid or pitch and the required diffusion vertical space, and also configured to support a poly gate contact (not shown) or poly cut 108 on poly 134.

Gap 124 between p-diffusion region 102 and n-diffusion region 103 is also consistent with the fin grid/pitch and the diffusion vertical space including the separation between n and p-diffusion regions specified in the standard cell library. In order to make various circuit connections to poly, e.g., using gate via 106, as well to have the ability to introduce poly cuts such as poly cut 108, gap 124 may be made larger than the minimum space allowed but still on a defined fin grid.

The horizontal metal or local interconnect layers as well as the top and bottom boundaries are not shown for simplicity of illustration. The power and ground rails (e.g., on a lower or lowest level of metal M0 or local interconnect) are also not shown in FIG. 1 but are assumed to run horizontally. In exemplary aspects, power rails need not be located on the top and bottom edges of cell architecture 100, but may be distributed within the cells, as noted previously, comprising multiple tracks which pass through horizontally and may connect with diffusion regions 101-104. Cell architecture 100 may support abutment with other cells designed with finfets, and options for extending diffusion regions (and LODs) 101-104 in manners which will be described with reference to the following figures.

Figure 2:
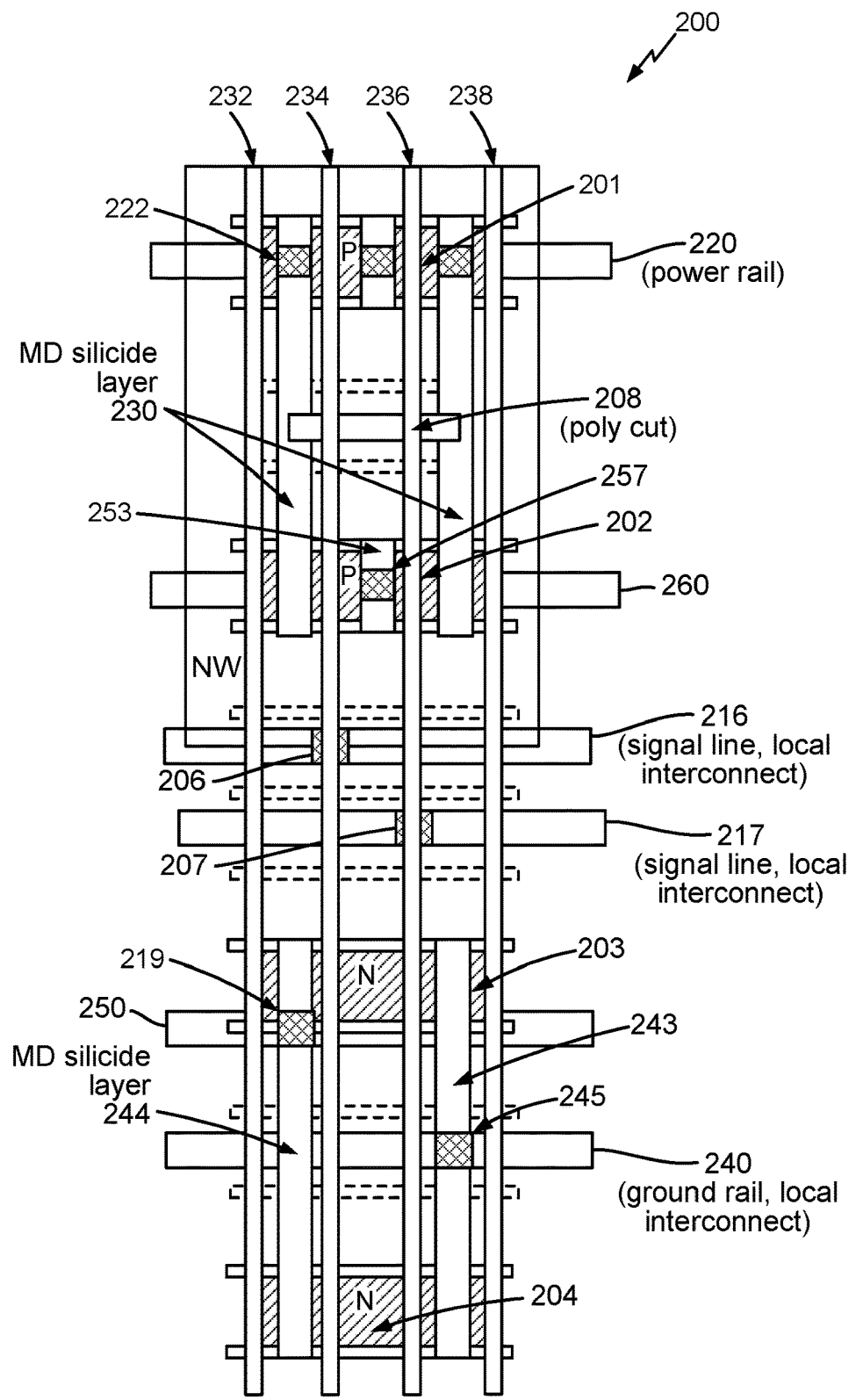
FIG. 2 illustrates the cell configuration of 2-input NAND gate employing a 4-fin nfet pulldown stack.

With reference now to FIG. 2, a cell architecture is shown for 2-input NAND 200 employing two nfets, a first nfet and a second nfet, which are 4-fin nfets (pulldown devices) connected in series, comprising 2 fins each in of the two n-diffusion regions 203 and 204; and two pfets, a first pfet and a second pfet, which are 2-fin pfets (pullup devices) in p-diffusion region 202. The series stacked first and second nfets in n-diffusion regions 203 and 204 share poly gates formed with common poly lines 234-236 with the first and second pfets in p-diffusion region 202 whereas the poly gates of pfets in p-diffusion region 201 are isolated or disconnected from the poly gates of pfets in p-diffusion region 202 using poly cut 208. The pfets in p-diffusion region 201 are isolated from the other components and as such, can either be left floating or connected to the power rail for example.

In FIG. 2, a distributed power rail network is shown with at least a first local power rail connected to at least one of the two p-diffusion regions and at least a second local power rail connected to at least one of the two n-diffusion regions. In exemplary aspects, the one or more power rails may be specifically associated with or dedicated to the diffusion regions, e.g., the first local power rail may be associated with or dedicated to one of the two p-diffusion regions and the second local power rail may be associated with or dedicated to one of the two n-diffusion regions. For example, in the illustration of FIG. 2, the gates of pfets in p-diffusion region 201 are floating while the related drain/source junctions are connected to the power rail 220 (which may be dedicated to p-diffusion region 201) through a metal to diffusion ("MD", which may be formed of silicide), shown as MD layer 230 layer connected to MD vias 222. MD layer 230 is used to connect the sources and drains of the various diffusion regions and overlap the diffusions for improved resistance of the underlying devices. MD layer 230 may generally not be disposed in close proximity to gate contact vias such as vias 206 or 207 to signal lines or local interconnects 216 and 217, respectively. Accordingly, MD layer 230 is disposed in a manner to prevent being placed next to an adjacent poly contact. MD layer 230 is shown to connect the sources of both pfets in p-diffusion regions 201 and 202, thus providing power connections to both p-diffusion regions 201 and 202.

Gate contacts 206 and 207 provide connectivity to the respective data inputs through local interconnect signal lines 216 and 217, respectively. The source terminals of nfets in n-diffusion regions 203 and 204 are connected together through MD 243 and then connected to a ground rail (GND) through local interconnect 240 and its associated via 245. As described above, MD layer 243 also connects the two n-diffusion regions 203 and 204 together, electrically and physically. The drain terminals of nfets formed in n-diffusion regions 203 and 204 are connected together in a "common" connection by MD layer 244 and are connected to a local interconnect routing layer 250 through via 219. The drains of pfets in p-diffusion island 202 are similarly connected through MD layer 253 to via 257 to local interconnect 260. Local interconnect 260 represents an output node of the pfets of NAND 200 and local interconnect node 250 represents the output node of the nfets of NAND 200. The connections associated with the outputs of 2-input NAND 200 (i.e., pfet drain of p-diffusion island 202 and the drains of nfets in n-diffusion islands 203 and 204) are not illustrated for the sake of simplicity, but these outputs may use a subsequent or higher level metal layer that runs vertically to connect to the local interconnects 250 and 260.

It is noted that although FIG. 2 shows only one power rail 220 and one ground rail 240, a distributed arrangement of power rails is also possible, as noted above, and illustrated in other examples, such as in FIG. 10, which will be further discussed in later sections of this disclosure.

The left and right edges of the standard cell architectures shown and described in this disclosure are defined as follows. In one aspect, the poly of the standard cell (e.g., poly lines 232 or 238 of cell 200) may be aligned directly on a left or right edge of the cell 200, respectively, which allows other cells to be placed on the left and/or right of cell 200 and to abut directly with cell 200. This abutment is enabled since widths of neighboring diffusion regions (e.g., similar to diffusion regions 201-204) can be made of consistent and same or uniform sizing, thus avoiding "diffusion stepping" which refers to arrangements wherein different diffusion sizes may be present and pose problems for cell abutment. By enabling cell abutment, diffusion regions 201-204 can be extended in exemplary aspects, thus, mitigating LOD effects.

Figure 3:
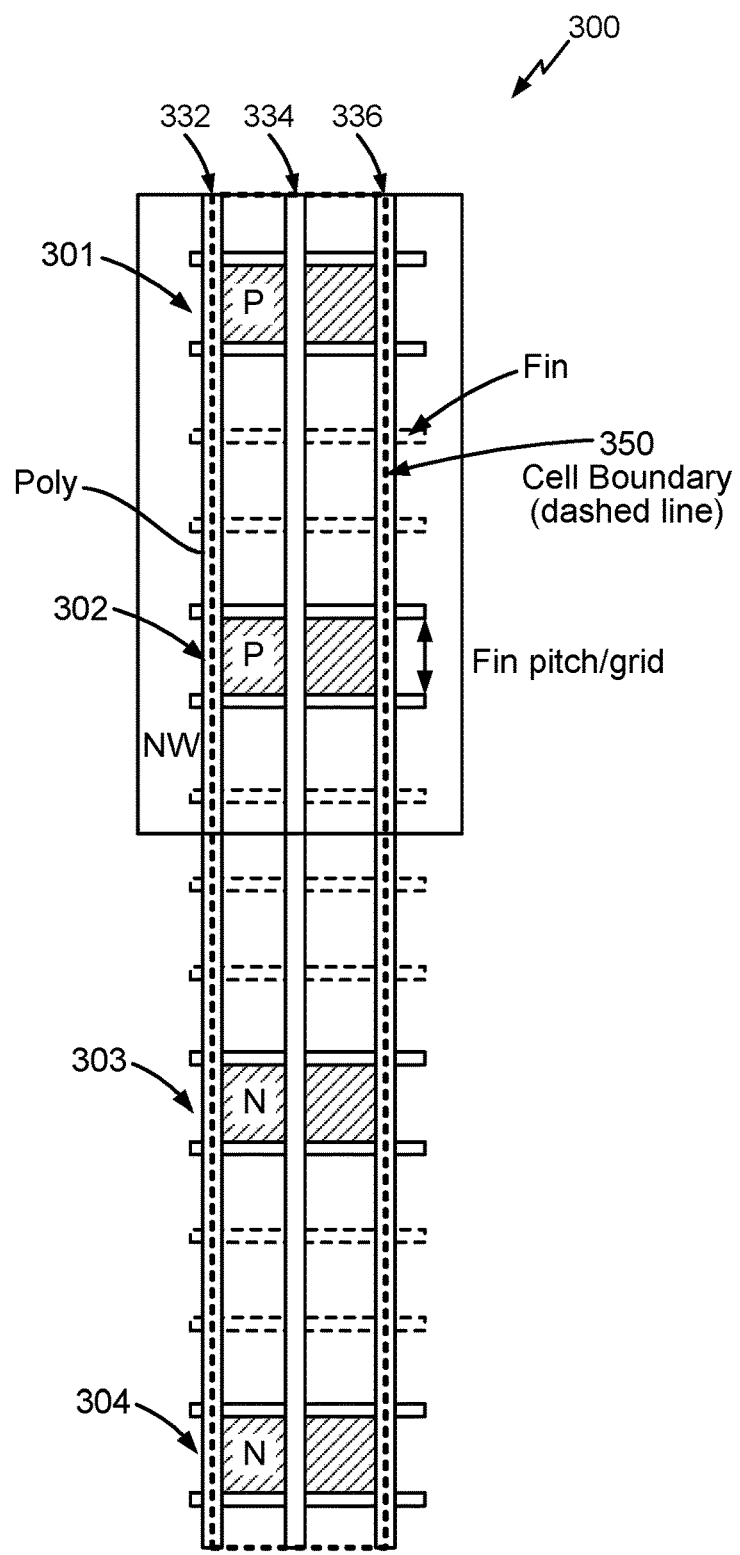
FIGS. 3-4 illustrate aspects related to abutment of logic cells.

In FIG. 3, aspects of standard cell architectures which may be used in cell abutment are shown and described with reference to cell 300. Cell 300 comprises p-diffusion regions 301, 302 and n-diffusion regions 303, 304, as previously described. Cell 300 also comprises poly lines 332, 334, and 336, wherein poly lines 332 and 336 may be adjacent to cell edges and structured as dummy or floating poly gates which are not connected to supply or signal lines and thus may be used to define the cell boundary 350 of cell 300, depicted with dashed lines. Lateral cells can be placed to meet or abut cell 300 at cell boundary 350. Poly lines 332 and 334 along cell boundary 350 may be common to cell 300 and any lateral cell (not shown) which abuts cell 300 at cell boundary 350. For cell 300 and another lateral cell abutting cell 300 at cell boundary 350, either the shared diffusion junctions (formed by extending one or more of diffusions 301-304) at cell boundary 350 may be of the same potential or the corresponding source/drain terminal may be biased in a manner to cause a device formed at the cell junction to be turned to an "off" state; or alternatively, a diffusion cut may be provided to isolate diffusion regions which do not share the same potential, while keeping in mind that such a diffusion cut which causes a diffusion break may restrict the LOD.

Figure 4:
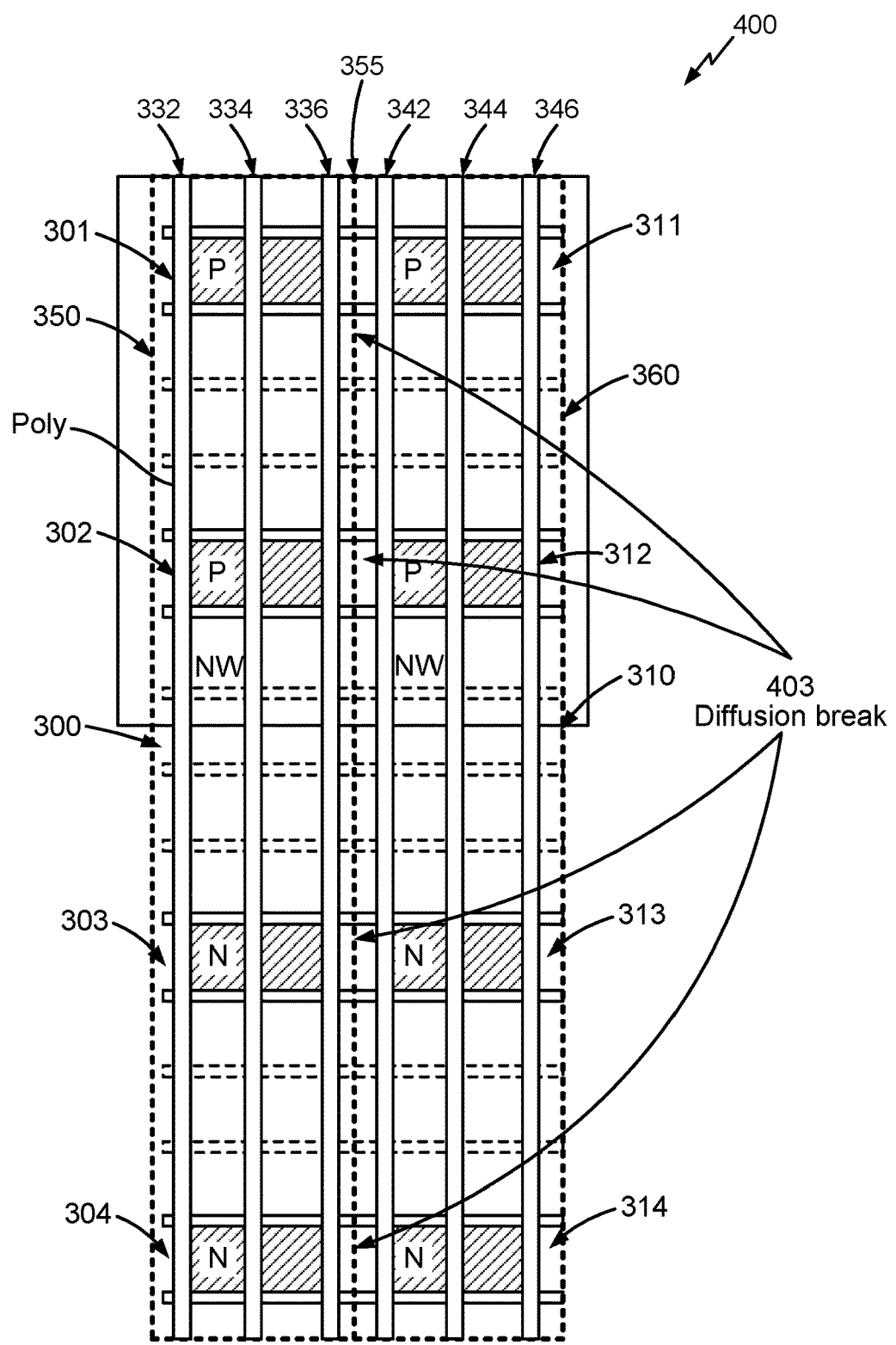

With reference now to FIG. 4, aspects of cell abutment (left and/or right) based on techniques described in FIG. 3 are shown for cell 400. Cell 400 comprises a first cell, e.g., cell 300 of FIG. 3 comprising at least one pfet formed on a first p-diffusion region (e.g., p-diffusion regions 301, 302) with a first fin count (e.g., 2-fin pfets which may be connected in parallel) and at least one nfet formed on a first n-diffusion region (e.g., n-diffusion region 303,304) with a second fin count (e.g., 2-fin nfets which may be connected in series). Cell 300 is abutted with a second cell, e.g., cell 310, comprising similarly described at least one pfet formed on a second p-diffusion region (e.g., p-diffusion regions 311, 312) with the first fin count (e.g., 2-fin pfets) and at least one nfet formed on a second n-diffusion region (e.g., n-diffusion regions 313, 314) with the second fin count (e.g., 2-fin nfets). Poly lines 342, 344, and 346 are provided for cell 310. The first and second cells 300 and 310 have respective cell boundaries 350 and 360, and when abutted, they have a common edge 355 at which diffusion breaks 403 may exist.

In FIG. 4, the left and right most poly lines (i.e., poly lines 332, 336 of cell 300; poly lines 342, 346 of cell 310) are inset by half the pitch of a poly gate (poly gate pitch), thus enabling local interconnect cut shapes on cell boundaries 350 and 360 of cells 300 and 310, respectively. The separation between the diffusion regions of cell 300 (a left placed cell in this view) and cell 310 (a right placed cell in this view) can effectively cause diffusion breaks 403 as shown, which can lead to a short LOD. Since all diffusion regions are the same size in exemplary aspects, two cell abutments are possible and the diffusion junctions (e.g., between p-diffusion regions 301 and 311; p-diffusion regions 302 and 312; n-diffusion regions 303 and 313; and n-diffusion regions 304 and 314) can be merged together using diffusion fills in the regions where diffusion breaks 403 are shown (the diffusion fills are not specifically illustrated in this view). Customized shape inclusions can be made when the diffusion junctions share a common potential or when a gate tie-off cell is introduced, as will be discussed below. At least one of poly lines 336 or 342, adjacent to common edge 355 may be floating, wherein the at least one of poly lines 336 or 342 may be formed as overlapping or intersecting at least one of p-diffusion regions 301 and 311; p-diffusion regions 302 and 312; n-diffusion regions 303 and 313; and n-diffusion regions 304 and 314.

Figure 5A:
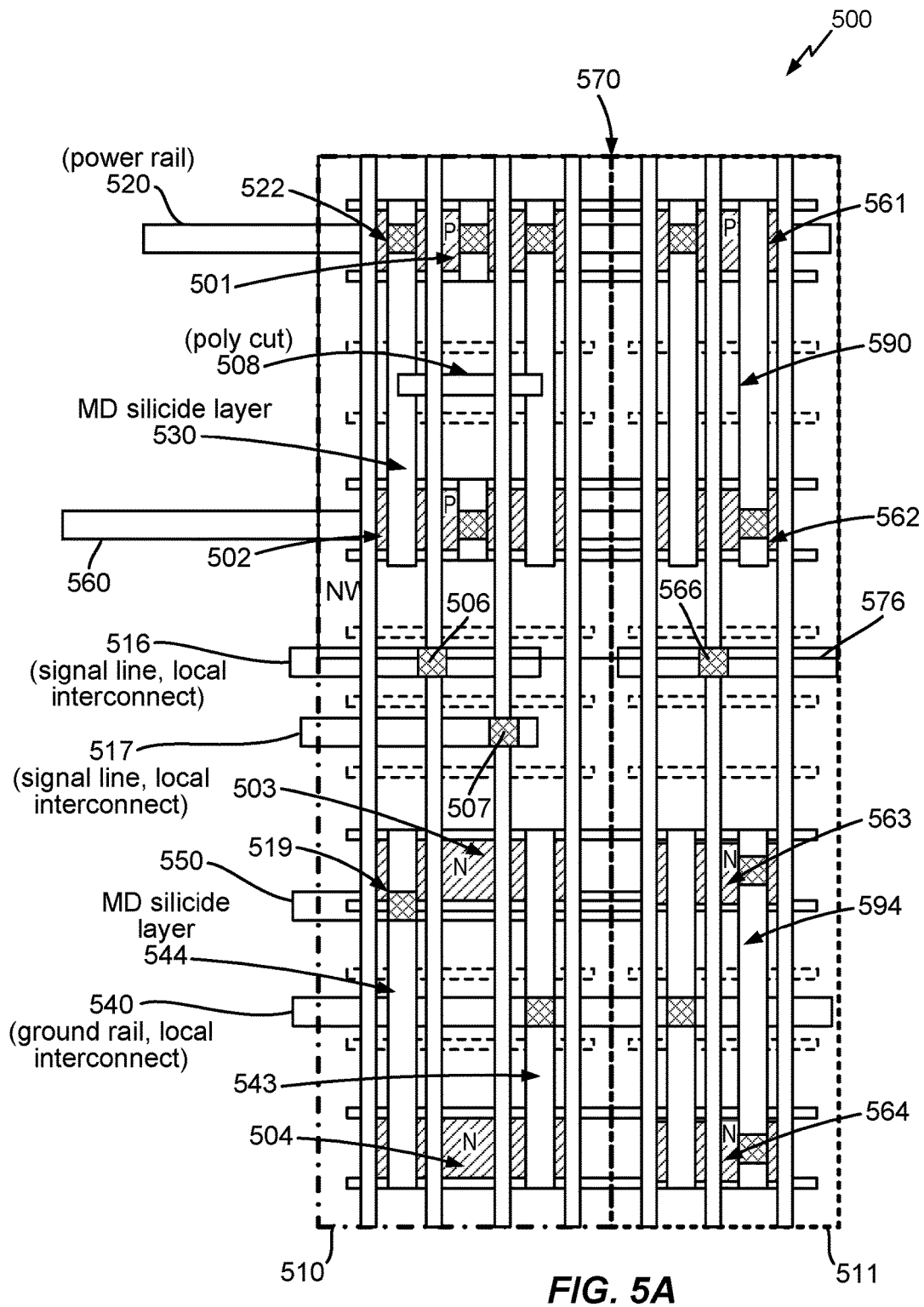
FIGS. 5A-B illustrate aspects of a 2-input AND designed according to disclosed cell placement techniques.

FIG. 5A illustrates an implementation of a 2-input AND 500, designed by the placement of two standard cells, a first cell, e.g., NAND 510 and a second cell, e.g., inverter 511. NAND 510 comprises a pair of series connected 2-fin stacked nfets formed in a first n-diffusion region, e.g., n-diffusion region 503 and another n-diffusion region, e.g., n-diffusion region 504 and a pair of parallel connected 2-fin pfets formed in a first p-diffusion region, e.g., p-diffusion region 502. The poly gates associated with another p-diffusion region, e.g., p-diffusion region 501 are isolated from the poly gates of p-diffusion region 502 with poly cut 508 placed on poly lines between the two p-diffusion regions 501 and 502 (it is noted that NAND 510 is similar to NAND gate 200 of FIG. 2). Poly gate contacts 506 and 507 connect to local interconnect signal lines 516 and 517, respectively. Signal lines 516 and 517 depict logic inputs a and b, respectively. The output of NAND gate 510 is derived on the local interconnect (M0) layers 550 and 560. The connections joining nodes formed at layers 550 and 560 (not illustrated) may use a subsequent metal level which runs vertically to connect to the local interconnect layers 550 and 560.

Inverter 511 connected to the output of NAND gate 510 comprises two 2-fin nfets formed in n-diffusion regions 563, 564 and two 2-fin pfets formed in p-diffusion regions 561, 562 (n-diffusion regions 563, 564 and p-diffusion regions 561, 562 have active transistors). Gate input via 566 connects the gate of inverter 511 to local interconnect 576 which will eventually be connected to a subsequent metal level which runs vertically. MD silicide layers 590 and 594 form the output of inverter 511 and may also be connected to local interconnect layers and subsequently to a subsequent metal level (not illustrated).

In FIG. 5A, it is recognized that the right edge of NAND gate 510 and the left edge of inverter 511, each have connections to both the power supply and the ground. However, as shown, each one of the right edge NAND gate 510 and the left edge of inverter 511 has a non-shared diffusion edge, which results in NAND gate 510 and inverter 511, each having reduced or a minimum LOD. Since all the diffusion regions (501, 502, 503, 504, 561, 562, 563 and 564) are of the same size as defined by this cell architecture and the p- and n-diffusions on the right side of NAND gate 510 and the left side of inverter 511 are electrically common to one another, the edge handling of the left edge of NAND gate 510 and the right edge of inverter 511 can be modified (e.g., based on an algorithm which may be implemented in cell layout tools) to accept new diffusion fills as described with reference to diffusion breaks 403 of FIG. 4, for tying diffusions which are electrically common, thereby enhancing their LODs.

Figure 5B:
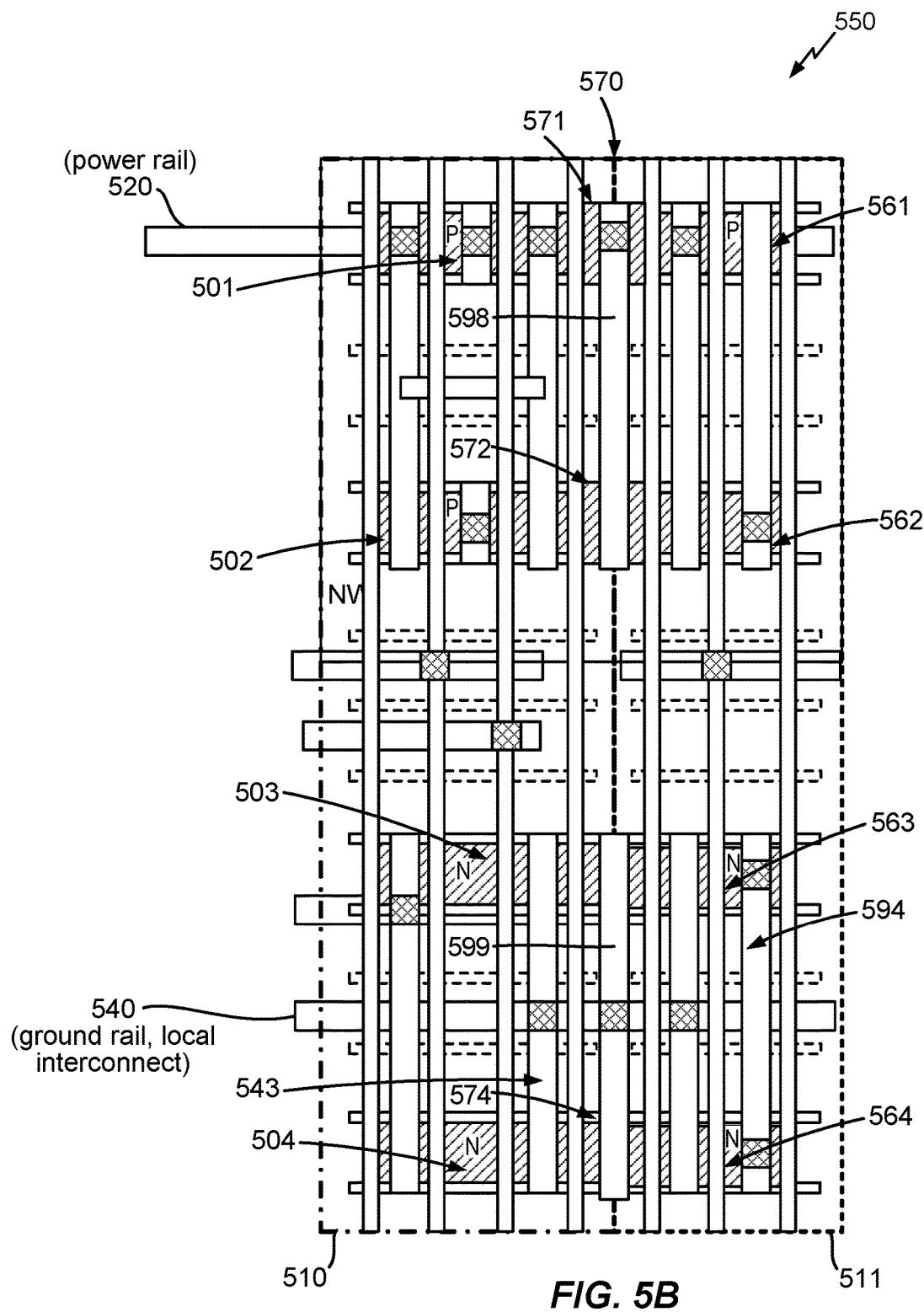

FIG. 5B illustrates AND gate 550 formed using aspects of tying common diffusion regions in the layout of AND gate 500 described with reference to FIG. 5A above. Diffusion fills 571, 572, 573, and 574 have been added to AND gate 500 of FIG. 5A to arrive at AND gate 550 of FIG. 5B in one aspect. A first p-diffusion fill, e.g., p-diffusion fill 571/572 may traverse the common edge 570 between NAND gate 510 and inverter 511 of FIG. 5A and join first p-diffusion region 501/502 of the first cell, NAND gate 510 and second p-diffusion region 561/562 of the second cell, inverter 511 of FIG. 5A, wherein the first and second p-diffusion regions are of a common first potential (e.g., which corresponds to the potential of power rail 520). Similarly, a first n-diffusion fill, e.g., n-diffusion fill 573/574 may traverse the common edge 570 between NAND gate 510 and inverter 511 of FIG. 5A and join first n-diffusion region 503/504 of the first cell, NAND gate 510 and second n-diffusion region 563/564 of the second cell, inverter 511 of FIG. 5A, wherein the first and second n-diffusion regions are of a common second potential (e.g., which corresponds to the potential of ground rail or local interconnect 540).

First metal layer and second metal layer (e.g., MD) 598 and 599, respectively, are added to form appropriate potentials (e.g., common first potential and common second potential, respectively) or facilitate connections for these diffusion fills (e.g., first p-diffusion fill 571/572 to power rail 520 and first n-diffusion fill 573/574 to ground rail/local interconnect 540) wherein the above-noted diffusion fills are introduced at common edge 570 between the cell boundaries of NAND gate 510 and inverter 511 of FIG. 5A. Metal layers 598 and 599 provide electrically common edge junctions on the right of NAND gate 510 and left of inverter 511, which are joined together with diffusion fills 571, 572, 573, and 574, along with common MD layer 598 and 599 and respective vias to the appropriate M0 local interconnects. Accordingly, in FIG. 5B, aspects of improving LOD by sharing electrically common junctions is shown for enabling two circuits (e.g., of NAND gate 510 and inverter 511) having different fin counts (e.g., sharing common diffusions using diffusion fills 571, 572, 573, and 574, without fin stepping).

Further, as seen, the left p-diffusion edge of NAND gate 510 is connected to power line 520 in both p-diffusion regions 501 and 502, and thus both of these junctions can potentially share a common diffusion region with another circuit (similar to the connections shown to inverter 511 using diffusion fills 571 and 572); whereas the left side of n-diffusions 503 and 504 of NAND gate 510 are associated with the output of NAND gate 510, and therefore the underlying n-diffusions 503 and 504 may not be shareable with another circuit without additional modifications such as a gate tie-off. Power rails 520 and 540 (for ground or other local interconnect) may be shared across NAND gate 510 and inverter 511.

Figure 6A:
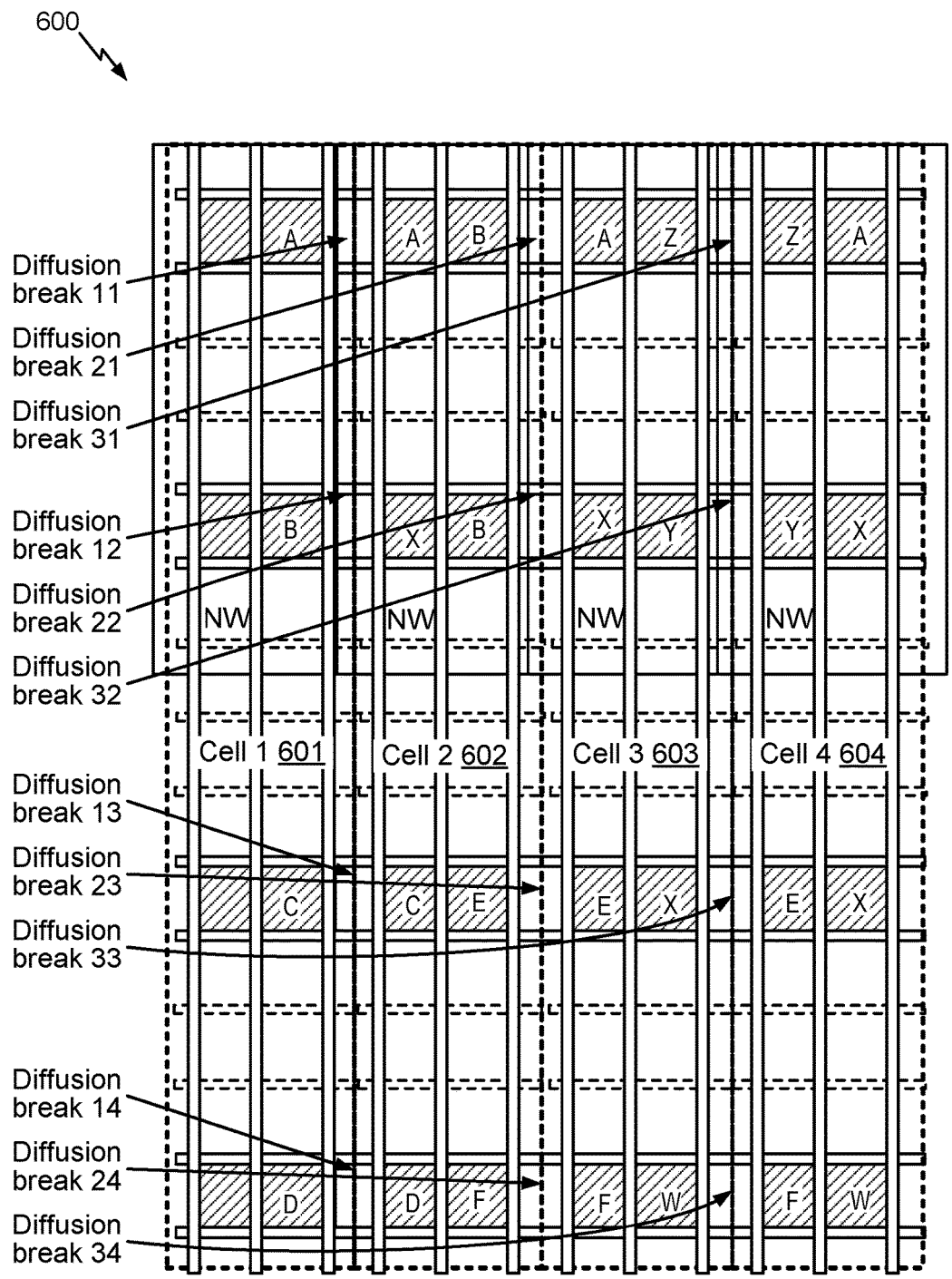
FIGS. 6A-B illustrates aspects related to left/right cell edge designs for improving LOD.

FIG. 6A illustrates cell architecture 600 showing aspects related to left/right cell edge designs (e.g., using exemplary algorithms) for increasing LOD (or mitigating LOD effects). Four different cell abutments are shown, with different common diffusion abutments. The diffusion junctions within the block identified as n-well (NW) are p-type and the diffusion regions outside NW are n-type (even though p-diffusion and n-diffusion have not been specifically identified otherwise in this figure). Within the various diffusion junctions, labels identifying nodes have been provided. Nodes with a common label can share diffusion regions (e.g., using diffusion fills such as 571-574 discussed with reference to FIGS. 5A-B) in the illustrated aspects (thus, lending these nodes for algorithmic junction LOD improvements), while nodes without common labels may not be able to share diffusions.

Figure 6B:
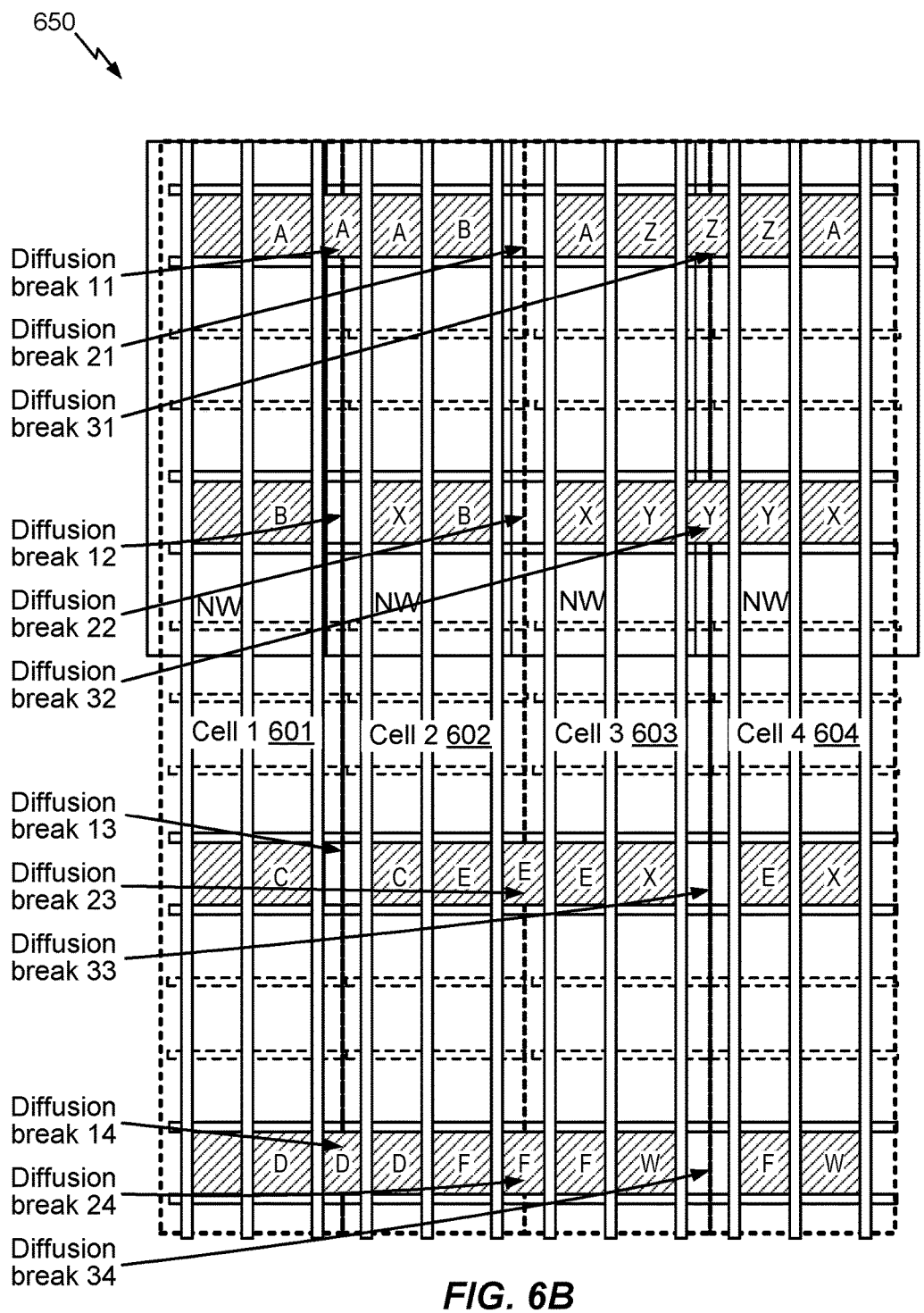

With combined reference to FIGS. 6A-B, diffusion breaks are identified by a column-row nomenclature (e.g., "13" represents column 1, row 3). Since diffusion breaks 11, 13, 14, 23, 24, 31, and 32 are associated with electrically common bordering diffusions an exemplary design (e.g., implemented by layout algorithms) can add the appropriate cells or shapes thereof to allow LOD manipulation, as shown in FIG. 6B. In FIG. 6B, LOD manipulation at identified junctions is seen in the cell architecture 650, relative to cell architecture 600 of FIG. 6A. Also, while not shown in FIG. 6B, the enhanced diffusion lengths may involve additional modifications, including via and MD shapes added to bolster electrical connectivity and in some cases via redundancy. Further, in some aspects, maximum LOD stipulations (if any, in design rules) can be supported by selectively not adding respective shapes to a given diffusion break region.

Furthermore, it is also possible to identify optimum locations in the layout to force a break in diffusion, e.g., to adhere to maximum LOD requirements, if any are specified in a design library or set of design rules.

Figure 7:
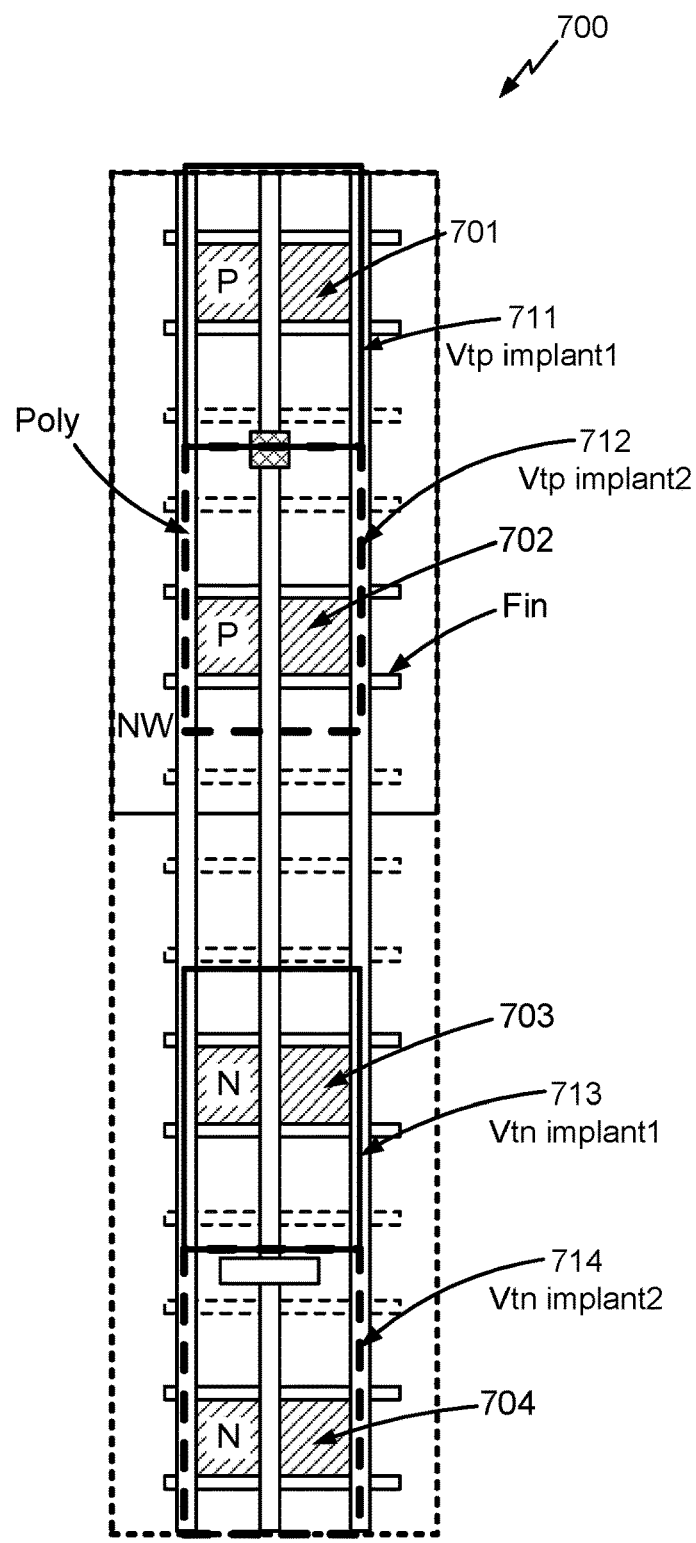
FIGS. 7-8 illustrate aspects related to tailoring implants for various diffusion regions of logic cells according to this disclosure.

With reference to FIG. 7, aspects of tailoring implants in standard cell designs are shown. Referring back to FIG. 1, two distinct p-diffusion regions 101, 102 and two distinct n-diffusion regions 103, 104 were shown. In FIG. 7, aspects of providing mixed implants in these distinct p and n-diffusion regions of FIG. 1 are illustrated. As shown in cell 700 of FIG. 7, p-diffusion region 701 has a Vtp implant1 711, p-diffusion region 702 has a Vtp implant2 712, n-diffusion region 703 has a Vtn implant1 713 and n-diffusion region 704 has a Vtn implant 714. While both n-type and p-type diffusions can have the same or common levels of implants within their respective type, supporting different or mixed levels of implants as in exemplary aspects of FIG. 7 offer additional tools for power and performance improvements.

For example, considering inverter 511 of FIGS. 5A-B comprising four pfet fins and four nfet fins, the best rising edge performance of signals passing through the inverter may be achieved by using SLVTp (super low Vtp) for the pfets and the nfets (SLVTn) if implant tailoring is not employed. However, with implant tailoring in FIG. 7, an intermediate Vtn can be realized, e.g., by having a SLVTn in one n-diffusion region 703 and a different Vtn, say LVTn (low Vtn), in the other n-diffusion region 704, which would reduce the leakage current in the off state of both nfets, while offering better falling edge performance than is seen when both n-diffusion regions 703 and 704 have the same LVTn implant. Exemplary implant tailoring can be performed algorithmically using timing and power optimizing tools real time or on-the-fly. Such algorithms may define which standard cell and diffusion regions/islands within the cells would benefit by the implant tailoring and then correspondingly generate the related implant shapes either in a flat mode or hierarchically by instantiating parameters to the standard cell of choice (which can override any default implants).

Figure 8:
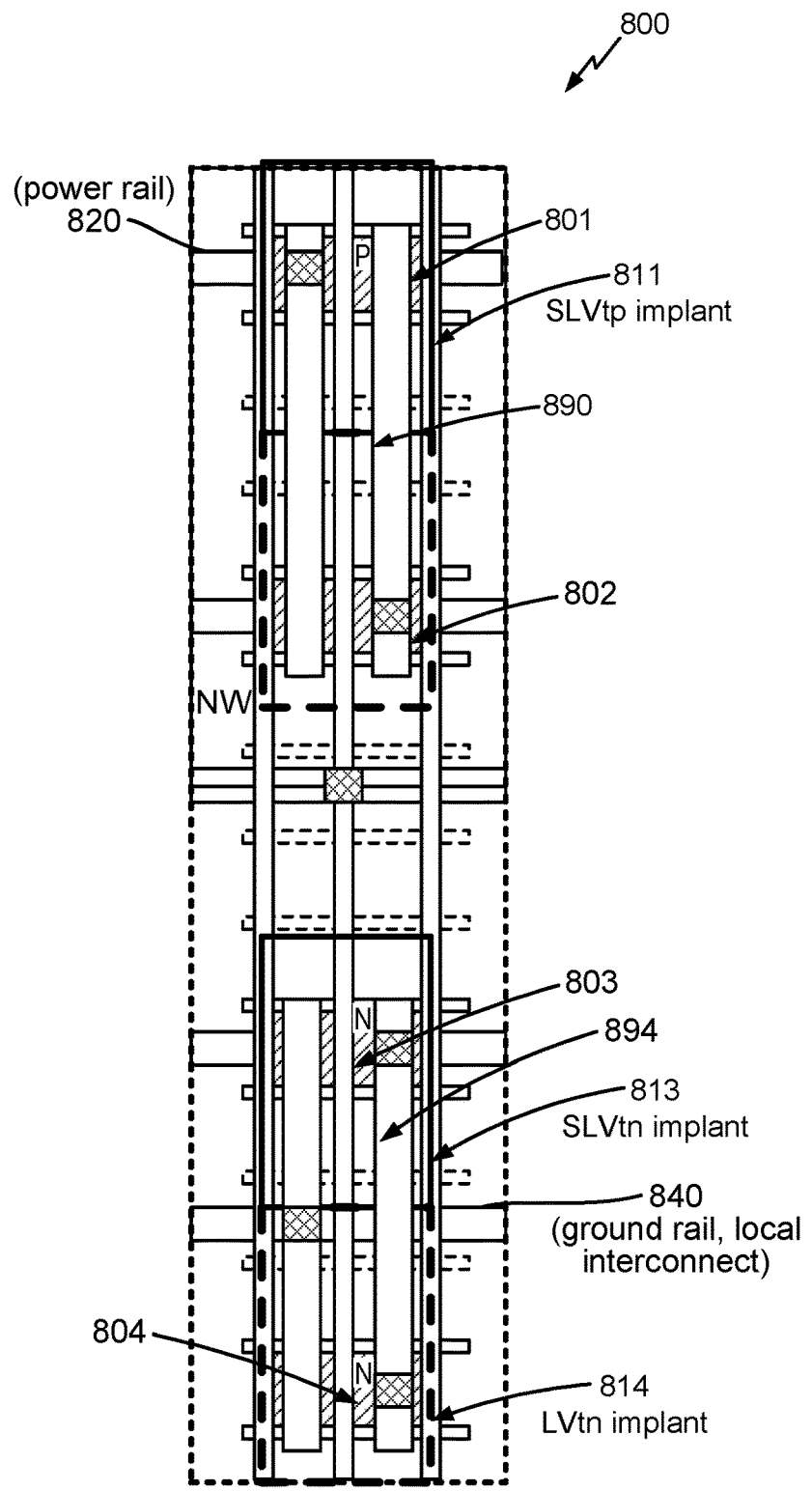

With reference to FIG. 8 inverter 800 with implant tailoring is shown, wherein p-diffusion regions 801 and 802 (connected to power rail 820) comprising the composite a 4-fin pfet has a single SLVTp implant 811 whereas n-diffusion region 803 comprising 2 fins has an SLVTn implant 813 and n-diffusion region 804 comprising the remaining 2 nfet fins has a LVTn implant 814 (with both n-diffusion regions 803 and 804 connected to power rail 840 for ground or local interconnections). The output connections 890 and 894 are shown without any connections to M1, a vertically running metal layer for illustration simplicity.

In FIGS. 4-6 standard cell placement with cells placed laterally in a row are shown. In conventional layouts, standard cells are generally placed in rows with each alternating vertical row having the mirror flip of the row beneath it or above it. This provides the ability to have common n-well (NW) and substrate regions between two vertically placed rows. The exemplary cell designs can also be similarly disposed, which creates a larger NW region and substrate region than conventional cell architecture and as such allows the various NW and substrate tap connections to be further apart, thereby saving area.

Figure 9:
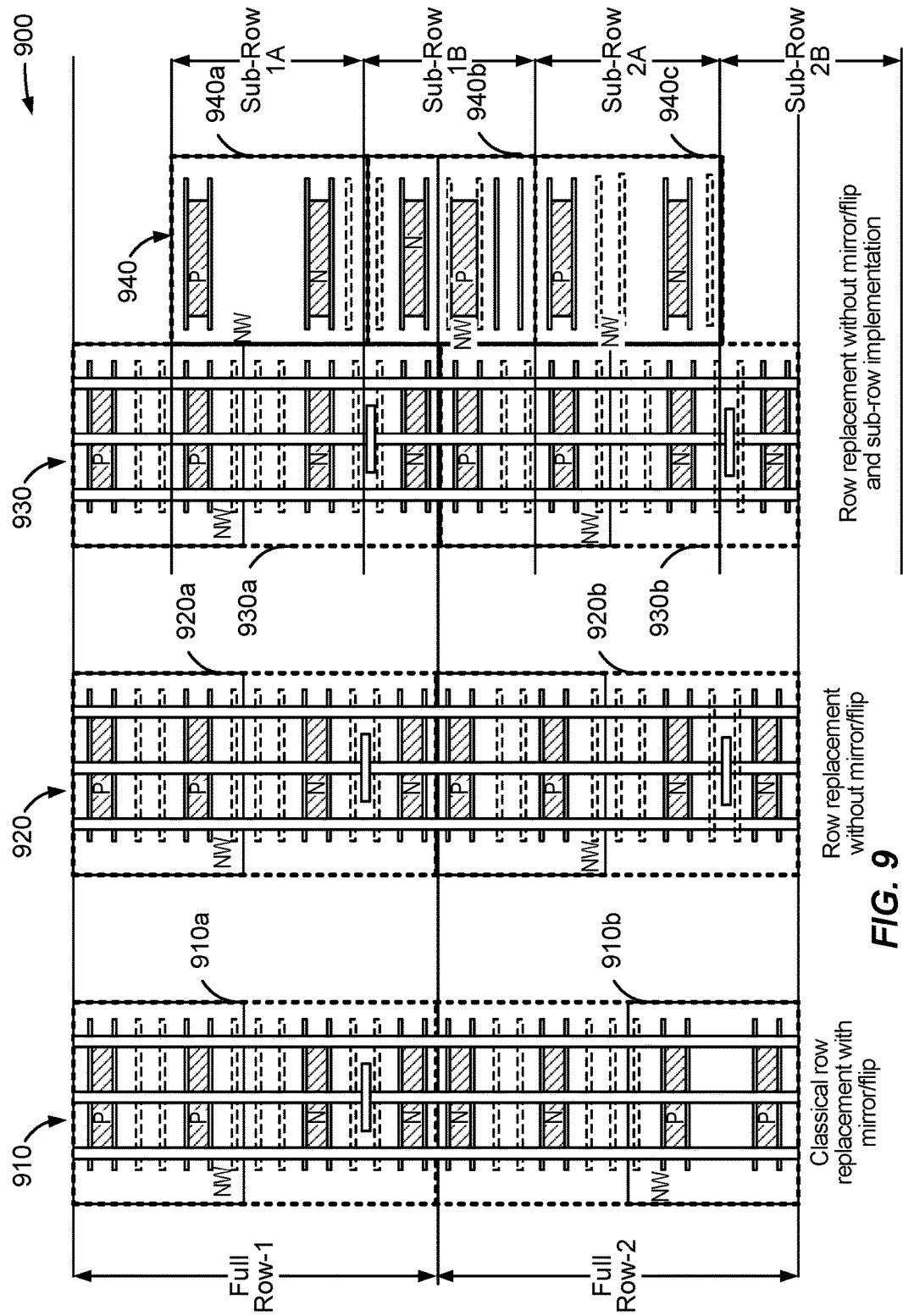
FIG. 9 illustrates aspects directed to half-row-height cells according to this disclosure.

In FIG. 9 an aspect of logic cell placement is shown for cell architecture 900. First and second full rows are illustrated as full rows 1 and 2, respectively, comprising logic cells which may be of standard or full height and alternatively referred to as full-row height logic cells. Columns 910, 920, and 930 are shown to include such full-row height logic cells. Among these, full-row height logic cells 910*a* and 910*b* in column 910 are vertically mirror-flipped with respect to one another (viewed from the perspective of n-diffusion regions and p-diffusion regions therein). Full-row height logic cells 910*a* and 910*b* in column 910 represent a conventional or classic arrangement of standard logic cells in adjacent full rows with vertical mirror-flipping employed between the logic cells in the same column in adjacent full rows. Vertical mirror-flipping in this manner allows like diffusion regions (e.g., n-diffusion regions of the full-row height logic cell 910*a* in full row 1 and full-row height logic cell 910*b* in full row 2) to be placed adjacent to one another.

The placement of full-row height logic cells in column 920 represent an exemplary arrangement wherein the full-row height logic cells 920*a* and 920*b* of full rows 1 and 2, respectively, are not vertically mirror-flipped with respect to one another, or alternatively referred to as the full-row height logic cells 920*a* and 920*b* being of the same orientation. This exemplary arrangement in column 920 allows half-row height logic cells to be created and placed in a manner which would enable diffusion fills between like diffusion regions of the full-row height logic cells and the half-row height logic cells, as will be explained in further detail below.

Referring to columns 930 and 940, a juxtaposition of full-row height cells 930*a*, 930*b* and half-row height cells 940*a*, 940*b*, 940*c* is shown. As in the case of column 920, full-row height cells 930*a* and 930*b* in full rows 1 and 2, respectively, of column 930 are also not vertically mirror-flipped with respect to one another. Half-row height logic cells 940*a*, 940*b*, and 940*c* shown in column 940 are each of half the height of one full-row height cell, such as full-row height logic cells 930*a*, 930*b* of column 930 (e.g., where the full-row height logic cells 930*a*, 930*b* in column 930 are each illustrated with two p-diffusion regions and two n-diffusion regions, the half-row height logic cells 940*a*, 940*b*, 940*c* in column 940 are each illustrated with a single p-diffusion region and a single n-diffusion region). The half-row height logic cells 940*a*, 940*b*, 940*c* may be placed in sub-rows 1A-B and 2A-B interspersed between the full rows 1 and 2, and any two vertically half-row height logic cells 940*a*, 940*b*, 940*c* may be vertically mirror flipped with respect to one another. In this manner, like diffusion regions between the full-row height logic cells 930*a*, 930*b* in column 930 and the half-row height logic cells 940*a*, 940*b*, 940*c* in column 940 may be placed in a manner which allows diffusion fills to be created and length of diffusions to be extended (e.g., a p-diffusion fill may be placed between one of the two p-diffusion regions of full-row height logic cell 930*a* and the p-diffusion region of half-row height logic cell 940*a*; an n-diffusion fill may be placed between one of the two n-diffusion regions of full-row height logic cell 930*b* and the n-diffusion region of half-row height logic cell 940*c*, etc.).

Figure 10:
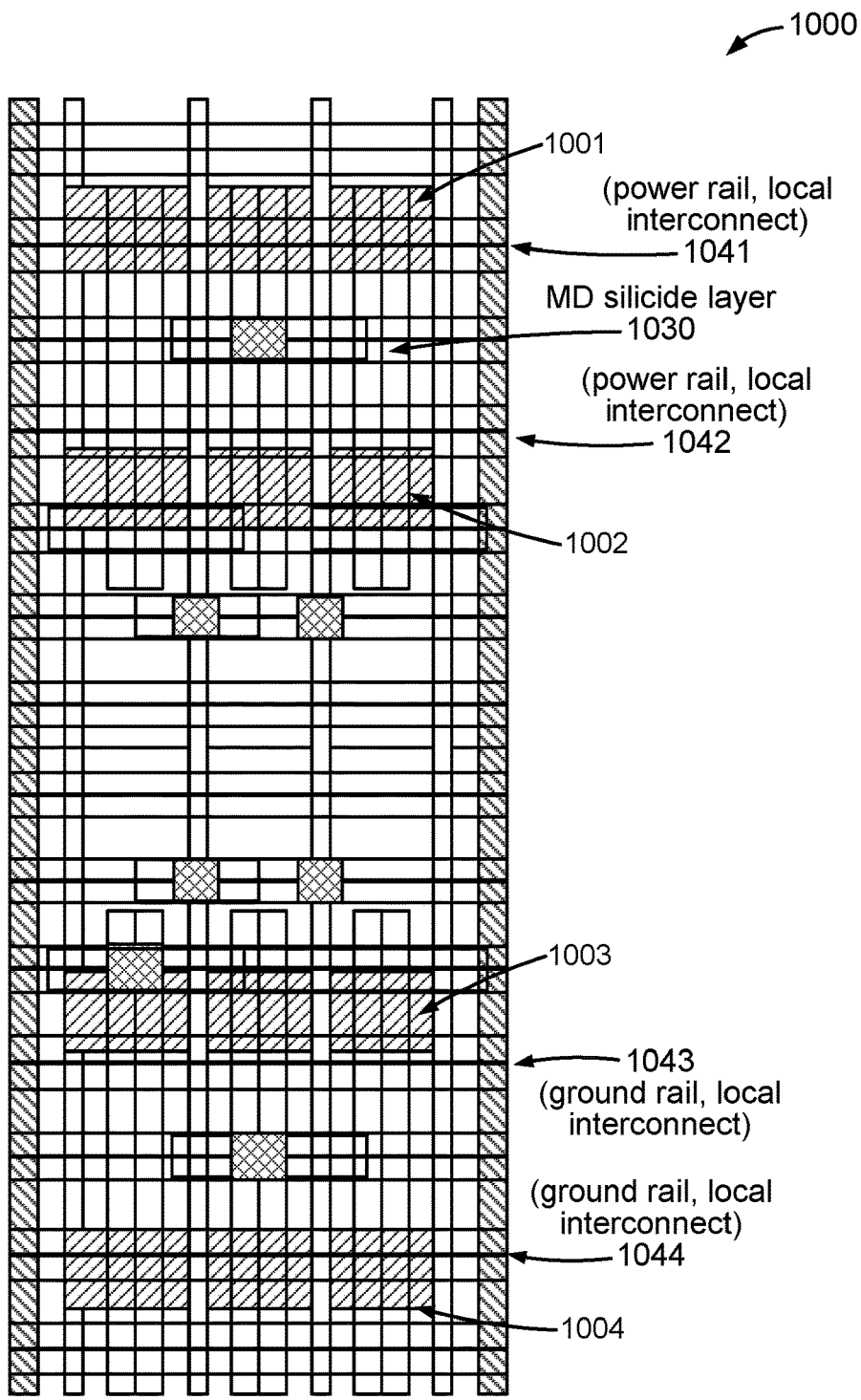
FIG. 10 illustrates cell layouts with integrated power/ground rails according to this disclosure.

With reference to FIG. 10, aspects of integrating distributed power and ground rails in logic cell layouts are shown for cell architecture 1000. In a standard cell architecture, a dual rail distributed power and ground rail may generally be integrated on a local interconnect (M0) layer, which allows each of the respective diffusion regions to be biased to the appropriate supply/ground rail with minimum IR (voltage drop) loss as a MD contact to the M0 rail can be readily integrated. On the other hand, in FIG. 10, cell 1000 with four distinct diffusion regions 1001, 1002, 1003, and 1004 can have multiple power and ground rails integrated therein, as follows. Two power rails 1041 and 1042 are shown in proximity to the p-diffusion regions 1001 and 1002, respectively. Similarly, two ground rails 1043 and 1044 are shown in proximity to n-diffusion regions 1003 and 1004, respectively. MD silicide layers 1030 are also shown and track locations for a set of power and ground M0 rails may be varied in accordance with this illustration.

Figure 11:
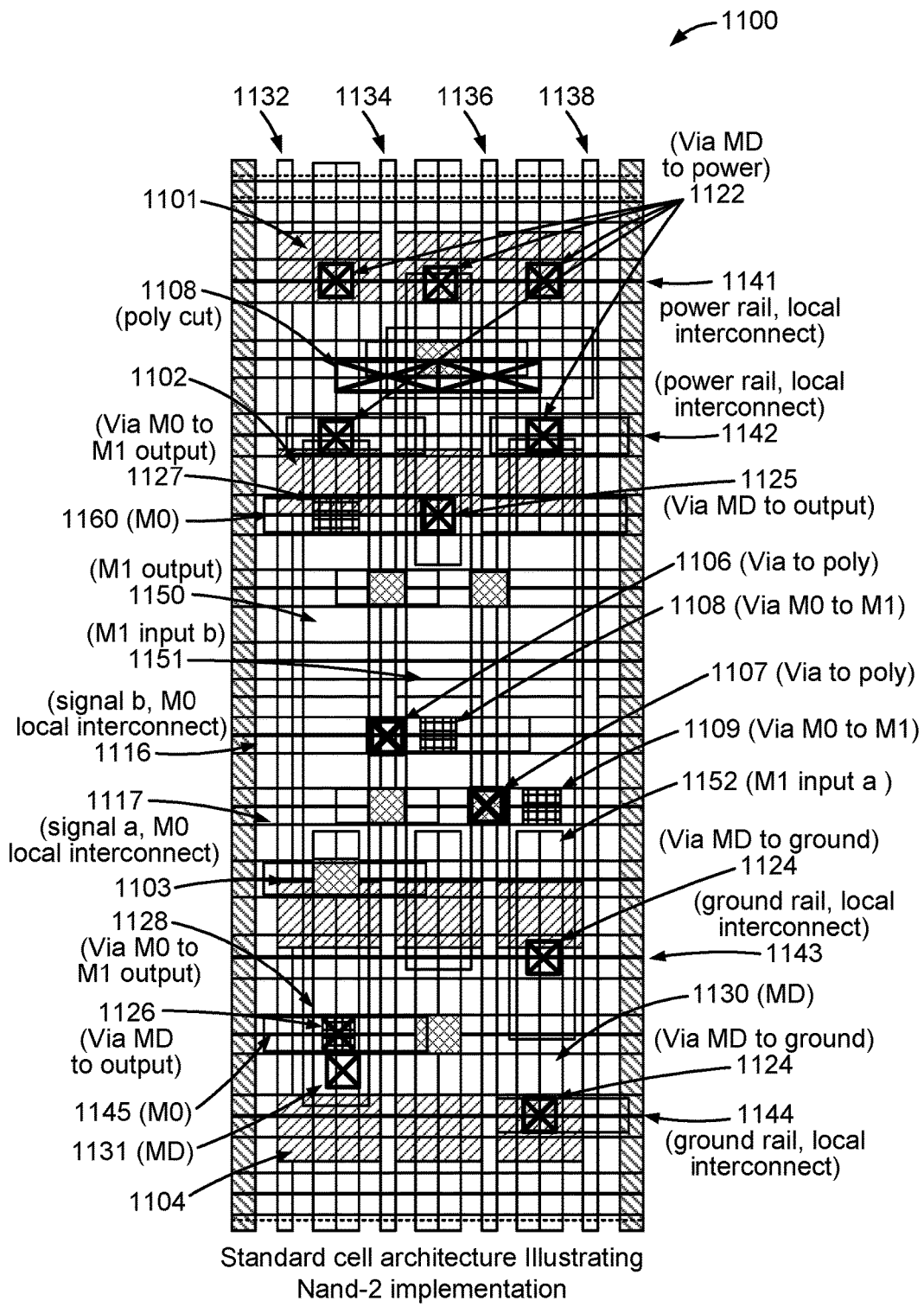
FIG. 11 illustrates an implementation of a 2-input NAND gate according to an aspect of this disclosure.
Figure 12:
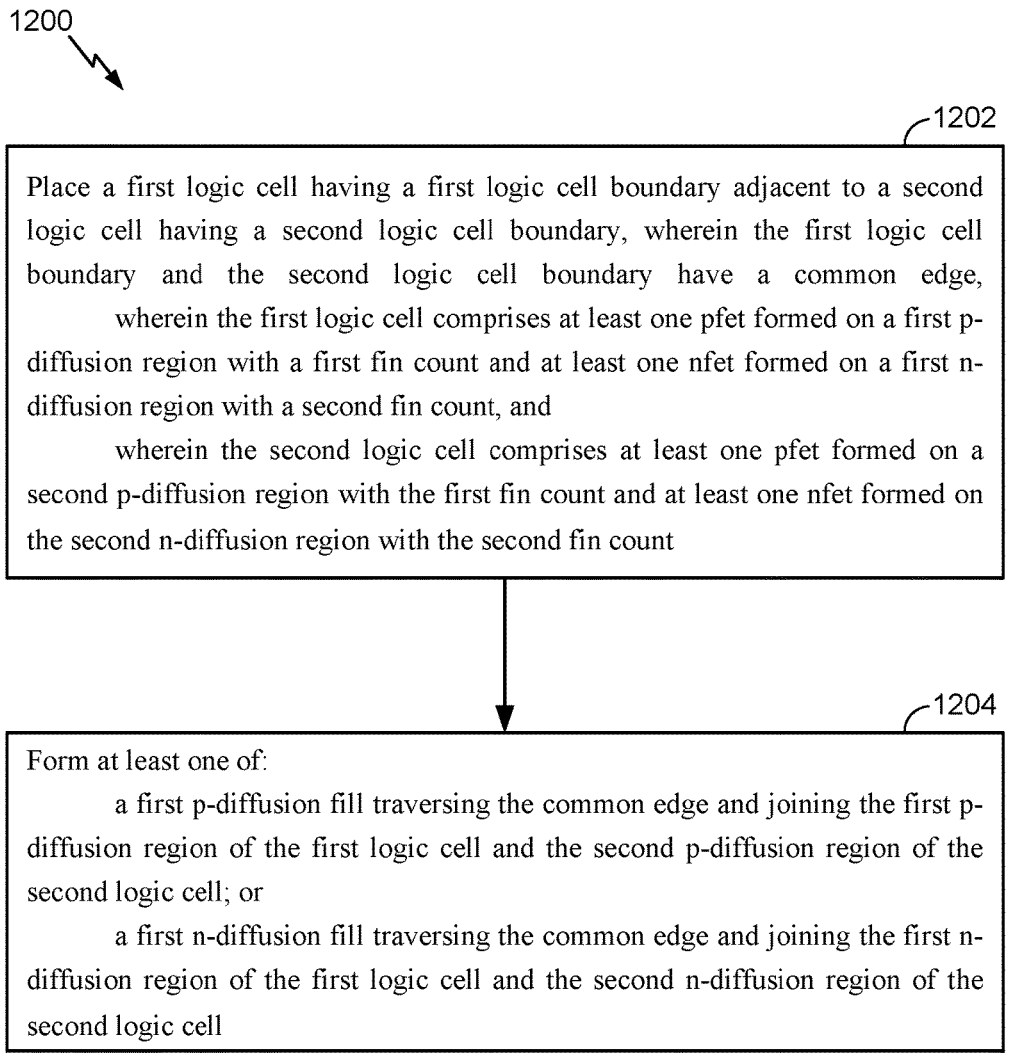
FIG. 12 illustrates a flowchart representation of an exemplary process, according to aspects of this disclosure.

FIG. 11 illustrates a layout of 2-input NAND 1100 comprising a 4-fin series connected nfet pulldown stack with two fins each in n-diffusion regions 1103 and 1104 and 2-fin pfet pullup devices in p-diffusion region 1102. Poly lines 1132, 1134, 1136, and 1138 are provided in a vertical direction as shown. The series stacked nfets have common poly lines 1132, 1134, 1136, and 1138 shared with the pfet in p-diffusion island 1102 whereas the poly gate of pfet 1101 is isolated or disconnected from the poly gate of pfet 1102 by means of the poly cut 1108 in poly lines 1134 and 1136. The pfets in p-diffusion region 1101 are isolated from the other components and as such, can either be left floating or connected to the power rail 1141 for example. In FIG. 11 the gates of pfets in p-diffusion region 1101 coupled to these poly lines 1134 and 1136 may be floating while drain/source junctions may be connected to the power rail 1142 through metal to diffusion (MD) layer to local interconnect vias 1122. MD silicide layers 1130 and 1131 may connect the sources and drains of the various diffusion regions and overlap the respective diffusions for improved resistance characteristics. In general, the MD layers may not be in close proximity to the gate contact via and as such, not pass next to an adjacent poly contact. MD layers (not labelled) are shown to connect the sources of both pfets in regions 1101 and 1102, thus providing power connections to both p-diffusion regions. Since this is a dual-power rail implementation, power rail vias 1122 make connections to power rails 1141 and 1142.

Gate contacts 1106 and 1107 provide connectivity to the respective data inputs through local interconnect signal lines 1116 and 1117, respectively. Vias 1108 and 1109 connect the 2 gate inputs b and a, respectively, to M1 lines 1151 and 1152 respectively. The source nodes of nfets in n-diffusion regions 1103 and 1104 are connected together through MD 1130 and then connected to both ground rails 1143 and 1144 through vias 1124. As described above, MD layers 1130, 1131 connect the two n-diffusion regions 1103 and 1104 together electrically and physically. The nfet drains of n-diffusion regions 1103 and 1104 are connected together in common by MD layer 1131 and are connected to a local interconnect routing layer 1145 through via 1126. The drains of pfets in p-diffusion region 1102 are similarly connected through MD to via to local interconnect 1160. The connections associated with the output (pfet drain of p-diffusion region 1102 and the drains of nfets in n-diffusion regions 1103 and 1104) are illustrated by means of via M0 to M1 1127, vias 1126 and 1128 and M1 1150.

While not explicitly illustrated, exemplary layout schemes enable the integration of mixed channel lengths within the standard cell. For example, the channel lengths associated with one or both of the two p-diffusion regions 1101 and 1102 or n-diffusion regions 1103 and 1104 in FIG. 11 can be an alternative channel length (e.g., respective widths of poly lines 1134 and 1136 forming gates for these pfets and nfets, respectively, may be modified to modify underlying channel widths of the gate junctions, and poly lines of disparate widths may be separated with poly cuts). This mixing of channel lengths can provide greater flexibility in designing a specific circuit while allowing direct integration with other circuits.

Accordingly, it will be appreciated that aspects include various methods for performing the processes, functions and/or algorithms disclosed herein. For example, as illustrated in FIG. 2A, an aspect can include a method 1200 of designing an integrated circuit (e.g., AND gate 500 of FIG. 5B) with finfet based logic cells, the method comprising:

In Block 1202, placing a first logic cell (e.g., NAND gate 510) having a first cell boundary adjacent to a second logic cell (e.g., inverter 511) having a second logic cell boundary, wherein the first logic cell boundary and the second logic cell boundary have a common edge (e.g., common edge 570), wherein the first logic cell comprises at least one pfet formed on a first p-diffusion region (e.g., first p-diffusion region 501/502 of the first cell, NAND gate 510) with a first fin count (2-fins) and at least one nfet formed on a first n-diffusion region (e.g., first n-diffusion region 503/504 of the first cell, NAND gate 510) with a second fin count (e.g., 4-fins), and wherein the second logic cell comprises at least one pfet formed on a second p-diffusion region (e.g., second p-diffusion region 561/562 of the second cell, inverter 511) with the first fin count (e.g., 2-fins) and at least one nfet formed on a second n-diffusion region (e.g., second n-diffusion region 563/564 of the second cell, inverter 511) with the second fin count (e.g., 2-fins).

Block 1204 comprises forming at least one of a first p-diffusion fill (e.g., p-diffusion fill 571/572) traversing the common edge and joining the first p-diffusion region of the first cell and the second p-diffusion region of the second cell; or a first n-diffusion fill (e.g., n-diffusion fill 573/574) traversing the common edge and joining the first n-diffusion region of the first cell and the second n-diffusion region of the second cell.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include non-transitory computer-readable storage media embodying exemplary integrated circuit designs, or more in some examples, non-transitory computer-readable storage media comprising data, the data comprising designs of integrated circuits comprising finfet based logic cells. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of designing an integrated circuit with finfet based logic cells, the method comprising forming at least a first logic cell with at least one of:
   two or more p-diffusion regions, stacked in a y-direction, with each of the two or more p-diffusion regions comprising two or more fins in an x-direction, and each of the two or more p-diffusion regions comprising an island with p-type doping in an n-type well; or
   two or more n-diffusion regions, stacked in the y-direction, with each of the two or more n-diffusion regions comprising two or more fins in the x-direction, and each of the two or more n-diffusion regions comprising an island with n-type doping in a p-type well.

2. The method of claim 1, further comprising forming the first logic cell with at least one of:
   a first p-diffusion region and a second p-diffusion region, the first p-diffusion region and the second p-diffusion region having different fin counts; or
   a first n-diffusion region and a second n-diffusion region, the first n-diffusion region and the second n-diffusion region having different fin counts.

3. The method of claim 1, further comprising forming a distributed power rail network with at least one of:
   at least a first local power rail associated with at least one of the two or more p-diffusion regions; or
   at least a second local power rail associated with at least one of the two or more n-diffusion regions.

4. The method of claim 3, wherein, at least one of:
   the first local power rail is dedicated to the at least one of the two or more p-diffusion regions; or
   the second local power rail is dedicated to the at least one of the two or more n-diffusion regions.

5. The method of claim 1, further comprising forming the first logic cell with at least one of:
   a first p-diffusion region and a second p-diffusion region, the first p-diffusion region and the second p-diffusion region formed with different levels of p-type implants; or
   a first n-diffusion region and a second n-diffusion region, the first n-diffusion region and the second n-diffusion region formed with different levels of n-type implants.

6. The method of claim 1, further comprising forming the first logic cell with at least one of:

a first pfet formed in a first p-diffusion region and a second pfet formed in a second p-diffusion region, the first pfet and the second pfet having different threshold voltages or channel lengths; or a first nfet formed in a first n-diffusion region and a second nfet formed in a second n-diffusion region, the first nfet and the second nfet having different threshold voltages or channel lengths.

7. The method of claim 1, comprising forming the first logic cell as a 2-input NAND gate with a ratio logic wherein a first fin count is different from a second fin count.

8. The method of claim 7, further comprising
forming two pfets having the first fin count equal to two fins in the first p-diffusion region and connecting the two pfets connected in parallel; and
forming two nfets, with each of the two nfets having the second fin count equal to four fins, with two of the four fins in the first n-diffusion region and two of the four fins in another n-diffusion region and connecting the two nfets in series.

9. The method of claim 8, further comprising forming at least one poly line, the at least one poly line shared between the two pfets and the two nfets.

10. The method of claim 9, further comprising placing a poly cut on the at least one poly line between the first p-diffusion region and another p-diffusion of the first logic cell.

11. The method of claim 9, further comprising forming at least one gate via on the at least one poly line between the two pfets and the two nfets and connecting a metal to diffusion (MD) layer to the at least one gate via.

12. A method of designing an integrated circuit with finfet based logic cells, the method comprising:
placing a first logic cell having a first logic cell boundary adjacent to a second logic cell having a second logic cell boundary, wherein the first logic cell boundary and the second logic cell boundary have a common edge, wherein the first logic cell comprises at least one pfet formed on a first p-diffusion region with a first fin count and at least one nfet formed on a first n-diffusion region with a second fin count, and
wherein the second logic cell comprises at least one pfet formed on a second p-diffusion region with the first fin count and at least one nfet formed on a second n-diffusion region with the second fin count; and
forming at least one of:
a first p-diffusion fill traversing the common edge and joining the first p-diffusion region of the first logic cell and the second p-diffusion region of the second logic cell; or
a first n-diffusion fill traversing the common edge and joining the first n-diffusion region of the first logic cell and the second n-diffusion region of the second logic cell.

13. The method of claim 12, comprising extending a length of diffusion (LOD) of at least one of:
the first p-diffusion region of the first logic cell and the second p-diffusion region of the second logic cell with the first p-diffusion fill; or
the first n-diffusion region of the first logic cell and the second n-diffusion region of the second logic cell with the first n-diffusion fill.

14. The method of claim 12, wherein at least one of:
the first p-diffusion region of the first logic cell and the second p-diffusion region of the second logic cell are of a common first potential; or the first n-diffusion region of the first logic cell and the second n-diffusion region of the second logic cell are of a common second potential.

15. The method of claim 14, further comprising forming at least one of:
a connection between the first p-diffusion fill and a first metal layer at the common first potential; or
a connection between the first n-diffusion fill and a second metal layer at the common second potential.

16. The method of claim 15, wherein the common first potential corresponds to a potential of a power rail, and the common second potential corresponds to a potential of a ground rail or a local interconnect.

17. The method of claim 16, wherein at least one of the power rail or the ground rail are distributed in a space between the diffusion regions of the first logic cell and the second logic cell.

18. The method of claim 12, further comprising floating at least one poly line of the first logic cell or the second logic cell, the at least one poly line adjacent to the common edge and intersecting at least one of the first p-diffusion region, the second p-diffusion region, the first n-diffusion region, or the second n-diffusion region.

19. The method of claim 12, wherein the first fin count is different from the second fin count.

20. The method of claim 19, wherein the first logic cell is a 2-input NAND gate with a ratio logic between the first fin count and the second fin count.

21. The method of claim 20, wherein forming the 2-input NAND gate comprises
connecting two pfets in parallel, with each of the two pfets having the first fin count equal to two fins formed on the first p-diffusion region; and
connecting two nfets in series, with each of the two nfets having the second fin count equal to four fins, with two of the four fins formed on the first n-diffusion region and two of the four fins formed on another n-diffusion region of the first logic cell connected in series with the first n-diffusion region.

22. The method of claim 21, comprising sharing at least one poly line between the two pfets and the two nfets.

23. The method of claim 21, comprising forming at least one gate via on at least one poly line between the two pfets and the two nfets.

24. The method of claim 23, comprising connecting the at least one gate via to a metal to diffusion (MD) layer.

25. The method of claim 24, wherein the second logic cell is an inverter comprising two pfets, with each pfet having the first fin count equal to two fins and formed in two p-diffusion regions including at least the second p-diffusion region; and two nfets, with nfet each having the second fin count equal to two fins and formed in two n-diffusion regions including at least the second n-diffusion region.

26. The method of claim 20, comprising placing a poly cut on at least one poly line between the first p-diffusion region and another p-diffusion of the first logic cell.

27. The method of claim 12, further comprising tailoring implants or threshold voltages of at least one of the first or second n-diffusion regions or first or second p-diffusion regions.

28. The method of claim 12, further comprising tailoring channel lengths of gates formed in at least one of the first or second n-diffusion regions or first or second p-diffusion regions.

29. A method of designing an integrated circuit with finfet based logic cells, the method comprising:

forming a first full row comprising at least a first full-row height logic cell, wherein the first full-row height logic cell comprises at least one of two or more p-diffusion regions or two or more n-diffusion regions;

forming a second full row adjacent to the first full row, the second full row comprising at least a second full-row height logic cell, wherein the second full-row height logic cell comprises at least one of two or more p-diffusion regions or two or more n-diffusion regions;

wherein the two or more p-diffusion regions of the first full row and the second full row are stacked in a y-direction, with each of the two or more p-diffusion regions comprising two or more fins in an x-direction, and each of the two or more p-diffusion regions comprising an island with p-type doping in an n-type well; or wherein the two or more n-diffusion regions of the first full row and the second full row are stacked in the y-direction, with each of the two or more n-diffusion regions comprising two or more fins in the x-direction, and each of the two or more n-diffusion regions comprising an island with n-type doping in a p-type well; and interspersing one or more sub-rows between the first full row and the second full row, wherein at least a first sub-row of the one or more sub-rows comprises a first half-row height logic cell comprising at least one p-diffusion region and at least one n-diffusion region, wherein at least one of:

the at least one p-diffusion region of the first half-row height logic cell is adjacent to one of the two or more p-diffusion regions of the first full-row height logic cell or the second full-row height logic cell, or the at least one n-diffusion region of the first half-row height logic cell is adjacent to one of the two or more n-diffusion regions of the first full-row height logic cell or the second full-row height logic cell.

30. The method of claim 29, comprising forming the second full-row height logic cell without vertically mirror-flipping the second full-row height logic cell with respect to the first full-row height logic cell.

31. The method of claim 29, comprising forming adjacent half-row height cells of two adjacent sub-rows of the one or more sub-rows by vertically mirror-flipping the adjacent half-row height cells of the two adjacent sub-rows of the one or more sub-rows with respect to one another.

32. The method of claim 29, further comprising extending, with at least one p-diffusion fill, a length of diffusion of the at least one p-diffusion region of the first half-row height logic cell and one of the two or more p-diffusion regions of the first full-row height logic cell or the second full-row height logic cell.

33. The method of claim 29, further comprising extending, with at least one n-diffusion fill, a length of diffusion of the at least one n-diffusion region of the first half-row height logic cell and one of the two or more n-diffusion regions of the first full-row height logic cell or the second full-row height logic cell.

34. A non-transitory computer-readable storage medium comprising code, which, when executed by a processor, causes the processor to perform operations for designing an integrated circuit with finfet based logic cells, the non-transitory computer-readable storage medium comprising:

code for forming at least a first logic cell with at least one of:

two or more p-diffusion regions, stacked in a y-direction, with each of the two or more p-diffusion regions comprising two or more fins in an x-direction, and each of the two or more p-diffusion regions comprising an island with p-type doping in an n-type well; or two or more n-diffusion regions, stacked in the y-direction, with each of the two or more n-diffusion regions comprising two or more fins in the x-direction, and each of the two or more n-diffusion regions comprising an island with n-type doping in a p-type well.

35. A non-transitory computer-readable storage medium comprising code, which, when executed by a processor, causes the processor to perform operations for designing an integrated circuit with finfet based logic cells, the non-transitory computer-readable storage medium comprising:

code for placing a first logic cell having a first logic cell boundary adjacent to a second logic cell having a second logic cell boundary, wherein the first logic cell boundary and the second logic cell boundary have a common edge, wherein the first logic cell comprises at least one pfet formed on a first p-diffusion region with a first fin count and at least one nfet formed on a first n-diffusion region with a second fin count, and wherein the second logic cell comprises at least one pfet formed on a second p-diffusion region with the first fin count and at least one nfet formed on a second n-diffusion region with the second fin count; and code for forming at least one of:

a first p-diffusion fill traversing the common edge and joining the first p-diffusion region of the first logic cell and the second p-diffusion region of the second logic cell; or a first n-diffusion fill traversing the common edge and joining the first n-diffusion region of the first logic cell and the second n-diffusion region of the second logic cell.

36. A non-transitory computer-readable storage medium comprising code, which, when executed by a processor, causes the processor to perform operations for designing an integrated circuit with finfet based logic cells, the non-transitory computer-readable storage medium comprising:

code for forming a first full row comprising at least a first full-row height logic cell, wherein the first full-row height logic cell comprises at least one of two or more p-diffusion regions or two or more n-diffusion regions;

code for forming a second full row adjacent to the first full row, the second full row comprising at least a second full-row height logic cell, wherein the second full-row height logic cell comprises at least one of two or more p-diffusion regions or two or more n-diffusion regions;

wherein the two or more p-diffusion regions of the first full row and the second full row are stacked in a y-direction, with each of the two or more p-diffusion regions comprising two or more fins in an x-direction, and each of the two or more p-diffusion regions comprising an island with p-type doping in an n-type well; or wherein the two or more n-diffusion regions of the first full row and the second full row are stacked in the y-direction, with each of the two or more n-diffusion regions comprising two or more fins in the x-direction, and each of the two or more n-diffusion regions comprising an island with n-type doping in a p-type well; and code for interspersing one or more sub-rows between the first full row and the second full row, wherein at least a first sub-row of the one or more sub-rows comprises a first half-row height logic cell comprising at least one p-diffusion region and at least one n-diffusion region, wherein at least one of:

the at least one p-diffusion region of the first half-row height logic cell is adjacent to one of the two or more p-diffusion regions of the first full-row height logic cell or the second full-row height logic cell, or the at least one n-diffusion region of the first half-row height logic cell is adjacent to one of the two or more n-diffusion regions of the first full-row height logic cell or the second full-row height logic cell.

* * * * *